United States Patent
Nakamura et al.

(10) Patent No.: US 12,534,397 B2
(45) Date of Patent: *Jan. 27, 2026

(54) GLASS FILLER AND METHOD FOR PRODUCING THE SAME, AND RESIN COMPOSITION INCLUDING GLASS FILLER

(71) Applicant: Nippon Sheet Glass Company, Limited, Tokyo (JP)

(72) Inventors: Aya Nakamura, Mie (JP); Tomohiro Yagyu, Mie (JP); Hidetoshi Fukuchi, Mie (JP); Junji Kurachi, Hyogo (JP)

(73) Assignee: NIPPON SHEET GLASS COMPANY, LIMITED, Tokyo (JP)

(*) Notice: Subject to any disclaimer, the term of this patent is extended or adjusted under 35 U.S.C. 154(b) by 1056 days.

This patent is subject to a terminal disclaimer.

(21) Appl. No.: 17/596,886

(22) PCT Filed: Jun. 19, 2020

(86) PCT No.: PCT/JP2020/024256
§ 371 (c)(1),
(2) Date: Dec. 20, 2021

(87) PCT Pub. No.: WO2020/256143
PCT Pub. Date: Dec. 24, 2020

(65) Prior Publication Data
US 2022/0315735 A1    Oct. 6, 2022

(30) Foreign Application Priority Data

Jun. 21, 2019 (JP) .............................. 2019-115734

(51) Int. Cl.
| | | |
|---|---|---|
| C03C 13/00 | (2006.01) | |
| C03B 37/005 | (2006.01) | |
| C03B 37/16 | (2006.01) | |
| C03C 3/091 | (2006.01) | |
| C03C 12/00 | (2006.01) | |
| C08K 3/40 | (2006.01) | |
| C08K 7/14 | (2006.01) | |

(52) U.S. Cl.
CPC ............ *C03C 13/00* (2013.01); *C03B 37/005* (2013.01); *C03B 37/16* (2013.01); *C03C 3/091* (2013.01); *C03C 12/00* (2013.01); *C08K 3/40* (2013.01); *C08K 7/14* (2013.01); *C03C 2213/00* (2013.01)

(58) Field of Classification Search
CPC ......... C03C 3/091; C03C 12/00; C03C 13/00; C08K 3/40; C08K 7/14
See application file for complete search history.

(56) References Cited

U.S. PATENT DOCUMENTS

| | | | |
|---|---|---|---|
| 4,166,745 A | 9/1979 | Araujo et al. | |
| 4,547,625 A | 10/1985 | Tosaki et al. | |
| 4,824,806 A * | 4/1989 | Yokoi | H05K 1/0366 501/67 |
| 11,773,009 B2 * | 10/2023 | Nakamura | H05K 1/038 523/222 |
| 11,840,477 B2 * | 12/2023 | Nakamura | C03C 13/00 |
| 2008/0103036 A1 * | 5/2008 | Boessneck | C03C 3/118 501/66 |
| 2011/0151261 A1 | 6/2011 | Fujiwara et al. | |
| 2011/0218268 A1 | 9/2011 | Ritter et al. | |
| 2012/0095149 A1 | 4/2012 | Sawanoi et al. | |
| 2015/0107575 A1 | 4/2015 | Plevacova et al. | |
| 2018/0127305 A1 * | 5/2018 | Li | C03C 13/06 |
| 2018/0190675 A1 | 7/2018 | Ichikawa | |
| 2019/0144329 A1 * | 5/2019 | Inaka | C03C 3/091 428/220 |
| 2019/0315650 A1 | 10/2019 | Fujiwara | |
| 2020/0039870 A1 | 2/2020 | Li | |
| 2020/0087196 A1 * | 3/2020 | Inaka | C03C 3/091 |
| 2020/0122433 A1 | 4/2020 | Hosoda et al. | |
| 2020/0181004 A1 | 6/2020 | Hausrath et al. | |
| 2020/0199015 A1 | 6/2020 | Hosokawa et al. | |
| 2020/0216351 A1 | 7/2020 | Hausrath et al. | |
| 2020/0231490 A1 | 7/2020 | Boek et al. | |

(Continued)

FOREIGN PATENT DOCUMENTS

| | | | | |
|---|---|---|---|---|
| CN | 101012105 A * | 8/2007 | ............ | C03C 13/00 |
| CN | 107735376 A | 2/2018 | | |

(Continued)

OTHER PUBLICATIONS

International Search Report issued in International Application No. PCT/JP2020/024256, Sep. 8, 2020, 7 pages/translation.
Written Opinion issued in International Application No. PCT/JP2020/024256, Sep. 8, 2020, 5 pages.
Extended European Search Report issued for European Patent Application No. 20825883.0, dated Jun. 23, 2023, 7 pages.
International Search Report and Written Opinion issued for International Patent Application No. PCT/JP2021/021815, Date of mailing: Aug. 24, 2021, 11 pages including English translation of Search Report.
Extended European Search Report issued for European Patent Application No. 21820877.5, dated May 23, 2024, 7 pages.
Benne, D. et al., "The effect of alumina on the Sn2+/Sn4+ redox equilibrium and the incorporation of tin in Na2O/Al2O3/SiO2 melts," Journal of Non-Crystalline Solids, vol. 337, No. 3, 2004, pp. 232-240.

(Continued)

*Primary Examiner* — Elizabeth A. Bolden
(74) *Attorney, Agent, or Firm* — HSML P.C.

(57) ABSTRACT

The present disclosure provides a novel glass filler that has a low permittivity and is suitable for mass production. A glass filler provided includes a glass composition that includes, in wt %, for example, $40 \leq SiO_2 \leq 60$, $25 \leq B_2O_3 \leq 45$, $0 < Al_2O_3 \leq 18$, $0 < R_2O \leq 5$, and $0 \leq RO \leq 12$, and satisfies at least one of: i) $SiO_2 + B_2O_3 \geq 80$ and $SiO_2 + B_2O_3 + Al_2O_3 \leq 99.9$; and ii) $SiO_2 + B_2O_3 \geq 78$, $SiO_2 + B_2O_3 + Al_2O_3 \leq 99.9$, and $0 < RO < 10$. Another glass filler provided includes a glass composition that includes $SiO_2$, $B_2O_3$, $Al_2O_3$, $R_2O$, and $3 < RO < 8$ at the same contents as the above, and satisfies $SiO_2 + B_2O_3 \geq 75$ and $SiO_2 + B_2O_3 + Al_2O_3 < 97$, where $R_2O = Li_2O + Na_2O + K_2O$ and $RO = MgO + CaO + SrO$.

20 Claims, 5 Drawing Sheets

(56) References Cited

U.S. PATENT DOCUMENTS

| | | | |
|---|---|---|---|
| 2022/0055942 A1 | 2/2022 | Tanaka | |
| 2022/0324751 A1 | 10/2022 | Nakamura et al. | |
| 2023/0234882 A1* | 7/2023 | Fujiwara | C03C 13/00 |
| | | | 501/66 |
| 2024/0116803 A1* | 4/2024 | Fujiwara | C03C 13/00 |
| 2024/0228362 A9* | 7/2024 | Fujiwara | C03C 3/095 |

FOREIGN PATENT DOCUMENTS

| | | |
|---|---|---|
| CN | 109790061 A | 5/2019 |
| CN | 110719897 A | 1/2020 |
| EP | 1083155 A1 | 3/2001 |
| EP | 2351716 A1 | 8/2011 |
| EP | 3988512 A1 | 4/2022 |
| EP | 4289802 A1 | 12/2023 |
| JP | S599992 A | 1/1984 |
| JP | 62-226839 | 10/1987 |
| JP | S63201041 A | 8/1988 |
| JP | 64-051345 | 2/1989 |
| JP | H02208236 A | 8/1990 |
| JP | H092839 A | 1/1997 |
| JP | H09268025 A | 10/1997 |
| JP | 2001080935 A | 3/2001 |
| JP | 2001122637 A | 5/2001 |
| JP | 2003137590 A | 5/2003 |
| JP | 2004107112 A | 4/2004 |
| JP | 2007031183 A | 2/2007 |
| JP | 2007246365 A | 9/2007 |
| JP | 2009-286686 | 12/2009 |
| JP | 2010-508226 | 3/2010 |
| JP | 2010064922 A | 3/2010 |
| JP | 2011162435 A | 8/2011 |
| JP | 2012-153582 | 8/2012 |
| JP | 2013-159546 | 8/2013 |
| JP | 2015516356 A | 6/2015 |
| JP | 2016528152 A | 9/2016 |
| JP | 2017520496 A | 7/2017 |
| JP | 2017526607 A | 9/2017 |
| JP | 2018177601 A | 11/2018 |
| JP | 2018203571 A | 12/2018 |
| JP | 2020093959 A | 6/2020 |
| WO | 2007138832 A1 | 12/2007 |
| WO | 2008/052154 | 5/2008 |
| WO | 2010024283 A1 | 3/2010 |
| WO | 2012017694 A1 | 2/2012 |
| WO | 2015023525 A1 | 2/2015 |
| WO | 2015168529 A1 | 11/2015 |
| WO | 2016035674 A1 | 3/2016 |
| WO | 2016040425 A1 | 3/2016 |
| WO | 2017/187471 | 11/2017 |
| WO | 2018/216637 | 11/2018 |
| WO | 2020256142 A1 | 12/2020 |

OTHER PUBLICATIONS

Smedskjaer, M. M. et al., "Viscosity and Fragility of Alkaline-Earth Sodium Boroaluminosilicate Liquids," Journal of the American Ceramic Society, vol. 96, No. 9, 2013, pp. 2831-2838.

International Search Report and Written Opinion issued for International Patent Application No. PCT/JP2022/004566, Date of mailing: Apr. 26, 2022, 14 pages including English translation of Search Report.

Extended European Search Report issued for European Patent Application No. 22749835.9, dated Feb. 17, 2025, 15 pages.

* cited by examiner

GLASS FILLER AND METHOD FOR PRODUCING THE SAME, AND RESIN COMPOSITION INCLUDING GLASS FILLER

TECHNICAL FIELD

The present invention relates to a glass filler. The present invention further relates to a method for producing a glass filler and to a resin composition including a glass filler.

BACKGROUND ART

In various parts mounted in an electronic device, resin compositions are widely used as an electrically-insulating member and a mechanism member. Use examples as the electrically-insulating member include a connector housing used for surface mount technology (SMT), flexible printed circuits (FPCs), board-to-board, central processing unit (CPU) sockets, memory cards, card edges, optical connectors, and the like, a reactance bobbin used for liquid crystal display (LCD) backlights, coils, flats, transformers, magnetic heads, and the like, a switch unit used for relay cases, relay base switches, reflow DIP switches, tact switches, and the like, a sensor case, a capacitor casing, a volume casing, and a trimmer casing. Use examples as the mechanism member include a lens holder and a pickup base for optical pickup, an insulator and a terminal for micromotors, and a drum for laser printers. Resin compositions are used also as a film such as a base film for FPC and a base film for copper clad laminates. In addition, some printed circuit boards mounted in electronic devices also include a board formed of a resin composition. Some printed wiring boards, which have no electronic components installed, also include a board formed of a resin composition. Hereinafter, in the present description, both printed circuit boards and printed wiring boards are referred to collectively as "printed boards".

The above resin compositions include a thermoplastic resin and an inorganic filler, and further include a curing agent, a modifying agent, or the like as necessary. A glass filler is sometimes used as an inorganic filler. A typical glass filler is a glass flake. In recent years, to meet the demand for reducing the size of electronic devices and the demand for reducing the thickness of the electronic devices to achieve a high performance, a resin composition is required to have a low permittivity, and accordingly constituent materials thereof are also required to have a low permittivity.

Printed circuit boards sometimes further include a glass fiber. The glass fiber is also required to have a low permittivity. Glass fibers formed of low-permittivity glass compositions are disclosed in Patent Literatures 1 to 5.

CITATION LIST

Patent Literature

Patent Literature 1: JP S62-226839 A
Patent Literature 2: JP 2010-508226 A
Patent Literature 3: JP 2009-286686 A
Patent Literature 4: WO 2017/187471 A1
Patent Literature 5: WO 2018/216637 A1

SUMMARY OF INVENTION

Technical Problem

However, studies have not been advanced sufficiently on reduction in permittivity of a glass filler. A glass composition for constituting a glass filler is required to have characteristic temperatures suitable for mass production as well as to have a low permittivity. Characteristic temperatures of the glass composition that are important for mass production of a glass filler include a temperature T3, that is, a temperature at which the viscosity is $10^3$ d·Pas. Temperatures T2 and T2.5 and a devitrification temperature TL also serve as indicators for determining whether the glass composition is suitable for mass production of a glass filler. However, it is not easy to adjust the characteristic temperatures of a glass composition having a low permittivity.

In view of the above, the present invention aims to provide a glass filler including a novel glass composition that has a low permittivity and is suitable for mass production.

Solution to Problem

The present invention provides a glass filler including a glass composition, wherein
the glass composition includes, in wt %:

$40 \leq SiO_2 \leq 60$;

$25 \leq B_2O_3 \leq 45$;

$5 \leq Al_2O_3 \leq 15$;

$0 < R_2O \leq 5$; and $0 < RO < 15$, and the glass composition satisfies:

$SiO_2 + B_2O_3 \geq 80$; and/or $SiO_2 + B_2O_3 \geq 78$ and $0 < RO < 10$.

In the present description, $R_2O$ is at least one oxide selected from $Li_2O$, $Na_2O$, and $K_2O$, and RO is at least one oxide selected from MgO, CaO, and SrO.

In another aspect, the present invention provides a glass filler including a glass composition, wherein
the glass composition includes, in wt %:

$40 \leq SiO_2 \leq 60$;

$25 \leq B_2O_3 \leq 45$;

$0 < Al_2O_3 \leq 18$;

$0 < R_2O \leq 5$; and $0 \leq RO \leq 12$, and the glass composition satisfies at least one of:

$SiO_2+B_2O_3 \geq 80$ and $SiO_2+B_2O_3+Al_2O_3 \leq 99.9$; and     i)

$SiO_2+B_2O_3 \geq 78, SiO_2+B_2O_3+Al_2O_3 \leq 99.9$, and
    $0<RO<10$.     ii)

In another aspect, the present invention provides a glass filler including a glass composition, wherein
the glass composition includes, in wt %:

$40 \leq SiO_2 \leq 60$;

$25 \leq B_2O_3 \leq 45$;

$0 < Al_2O_3 \leq 18$;

$0 < R_2O \leq 5$; and $3 < RO < 8$, and the glass composition satisfies:

$SiO_2+B_2O_3 \geq 75$; and $SiO_2+B_2O_3+Al_2O_3 < 97$.

In another aspect, the present invention provides a glass filler including a glass composition, wherein
the glass composition satisfies, in wt %, $SiO_2+B_2O_3 \geq 77$,
the glass composition has a permittivity of 4.4 or less at a frequency of 1 GHz, and
a temperature T2 at which a viscosity of the glass composition is $10^2$ d·Pas is 1700° C. or less.

In yet another aspect, the present invention provides a resin composition including:
the glass filler according to the present invention; and
a thermoplastic resin.

In yet another aspect, the present invention provides a method for manufacturing a glass filler, the method including: melting the above-described glass composition; and forming the molten glass composition into a glass filler. The method for manufacturing a glass filler may be a method including: melting a glass raw material, the glass raw material being prepared such that a glass composition constituting the above-described glass filler is obtained from the glass raw material; and forming the glass raw material being molten into the glass filler.

Advantageous Effects of Invention

According to the present invention, it is possible to provide a glass filler including a glass composition that has a lower permittivity and has characteristic temperatures suitable for mass production. The glass filler according to the present invention is suitable for improvement in various properties of a resin composition by incorporation of a glass filler while including the resin composition having a decreased permittivity. This improvement includes, for example, enhancement in strength, heat resistance, and dimensional stability, decrease in linear thermal expansion coefficient and reduction in its anisotropy, and reduction in anisotropy of the shrinkage factor at molding.

DESCRIPTION OF EMBODIMENTS

Figure 1A:
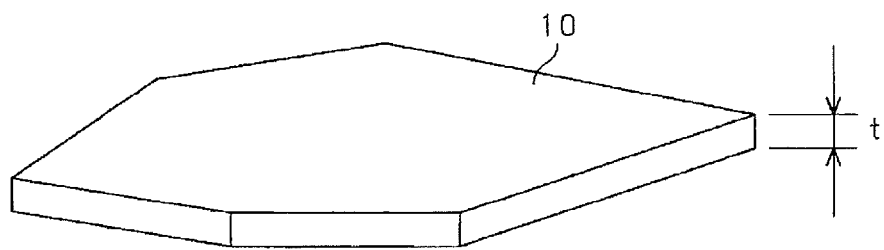
FIG. 1A is a perspective view showing an example of a glass flake.

Hereinafter, the symbol "%" indicating the content of each component means "wt %" in every case. The phrase "substantially free of" means that the content is less than 0.1 wt %, preferably less than 0.07 wt %, and more preferably less than 0.05 wt %. The term "substantially" in this phrase is intended to allow impurities inevitably introduced from industrial raw materials within the above limits. The content, properties, and other preferred ranges of each component can be understood by arbitrarily combining the upper and lower limits individually described below.

In the following description, as the characteristic temperature of a glass composition, a temperature at which the viscosity is $10^n$ d·Pas is expressed as Tn (for example, T2.5 means a temperature at which the viscosity of the glass composition is $10^{2.5}$ d·Pas). Permittivity refers to relative permittivity (dielectric constant) in a strict sense. In the present specification, relative permittivity is expressed simply as permittivity, as is conventional. Values of permittivity and dielectric loss tangent are those determined at room temperature (25° C.). The following description is not intended to limit the present invention, and is provided in the sense of indicating preferred embodiments thereof.

[Components of Glass Composition]

($SiO_2$)

$SiO_2$ is a component forming a network structure of glass. $SiO_2$ acts to decrease the permittivity of a glass composition. An excessively low $SiO_2$ content cannot sufficiently decrease the permittivity of the glass composition. An excessively high $SiO_2$ content excessively increases the viscosity at melting and thus a homogeneous glass composition is difficult to obtain. The $SiO_2$ content is preferably 40% or more, 45% or more, 46% or more, more preferably 48% or more, and particularly preferably 49% or more, and may be, in some cases, 50% or more, even 50.5% or more, 51% or more, 52% or more, or 53% or more. The $SiO_2$ content is preferably 60% or less, less than 58%, 56% or less, more preferably less than 55%, and particularly preferably 54.5% or less, and may be, in some cases, 54% or less, 53% or less, 52% or less, or 51% or less. An example of a preferred range of the $SiO_2$ content is 40% or more and less than 58%, and even 40% or more and less than 55%. In addition, the $SiO_2$ content can be 40% or more and 49.95% or less.

($B_2O_3$)

$B_2O_3$ is a component forming a network structure of glass. $B_2O_3$ acts to decrease the permittivity of the glass composition, and also acts to decrease the viscosity of the glass composition at melting to improve the defoaming performance (bubble removability), thereby reducing inclusion of bubbles in the glass filler formed. On the other hand, $B_2O_3$ is prone to volatilization at melting of the glass composition. An excessively high content of $B_2O_3$ makes it difficult to achieve a sufficient homogeneity of the glass composition, or insufficiently reduces inclusion of bubbles in the glass filler. The $B_2O_3$ content is preferably 25% or more, 27% or more, 29% or more, 30% or more, and more preferably more than 30%, and may be, in some cases, 30.5% or more, even 31% or more, 32% or more, 33% or more, or 34% or more. The $B_2O_3$ content is preferably 45% or less, 43% or less, 41% or less, and more preferably 39% or less, and may be, in some cases, 38% or less, even 36% or less, 35% or less, 34% or less, or 32% or less. An example of a preferred range of the $B_2O_3$ content is more than 30% and 45% or less. In addition, the $B_2O_3$ content can be 25% or more and 40% or less, 25% or more and 29.9% or less, or 31% or more and 40% or less.

($SiO_2+B_2O_3$), ($SiO_2+B_2O_3+Al_2O_3$)

To obtain a glass composition having a sufficiently low permittivity, the total of the $SiO_2$ content and the $B_2O_3$ content, that is, ($SiO_2+B_2O_3$) may be adjusted to 77% or more, 78% or more, or even 80% or more. ($SiO_2+B_2O_3$) is preferably 81% or more, 82% or more, and more preferably 83% or more, and may be, in some cases, 84% or more, or even 85% or more. ($SiO_2+B_2O_3$) may be 90% or less, or even 87.5% or less. This is because an excessively high value of $(SiO_2+B_2O_3)$ encourages the tendency for the glass composition to undergo phase separation. In addition, $(SiO_2+B_2O_3)$ can be 70% or more. The total of the $SiO_2$ content, the $B_2O_3$ content, and the $Al_2O_3$ content, that is, $(SiO_2+B_2O_3+Al_2O_3)$ is suitably 99.9% or less in order to allow additional components. $(SiO_2+B_2O_3+Al_2O_3)$ may be 98% or less, 97% or less, less than 97%, or even 96% or less. In a preferred example of a combination of $(SiO_2+B_2O_3)$ and $(SiO_2+B_2O_3+Al_2O_3)$, $(SiO_2+B_2O_3)$ is 82% or more and $(SiO_2+B_2O_3+Al_2O_3)$ is 98% or less. Also, $(SiO_2+B_2O_3+Al_2O_3)$ can be 90% or more and 98% or less, or 90% or more and 97% or less.

(Preferred Combination of $SiO_2$ and $B_2O_3$)

To obtain a glass composition that has a lower permittivity and is easy to melt, there are combinations of the $SiO_2$ and $B_2O_3$ contents within preferred ranges. A first combination is a combination in which the $SiO_2$ content is 48 to 51%, preferably 49 to 51%, and more preferably 50 to 51%, and the $B_2O_3$ content is 33 to 35%, and preferably 34 to 35%. A second combination is a combination in which the $SiO_2$ content is 50 to 53%, and preferably 51 to 52%, and the $B_2O_3$ content is 32 to 35%, and preferably 32 to 34%. A third combination is a combination in which the $SiO_2$ content is 52 to 54%, and preferably 52.5 to 54%, and the $B_2O_3$ content is 31 to 34%, and preferably 32 to 34%. A fourth combination is a combination in which the $SiO_2$ content is 52 to 55%, and preferably 53 to 55%, and the $B_2O_3$ content is 30 to 32%.

A fifth combination is a combination in which the $SiO_2$ content is 47 to 52%, preferably 48 to 51%, more preferably 48.5 to 50.5%, and particularly preferably 48.95 to 49.95%, and the $B_2O_3$ content is 25 to 30%, preferably 26 to 29.5%, and more preferably 26 to 29%. In the fifth combination, the total of the MgO content and the CaO content, that is, (MgO+CaO) is suitably 3.5% or more, and more suitably 4% or more, and is suitably 8% or less. A sixth combination is a combination in which the $SiO_2$ content is 48 to 53%, preferably 49 to 52%, and more preferably 49 to 51.5%, and is, in some cases, 49 to 51% or 48.95 to 49.95%, and the $B_2O_3$ content is 28 to 35%, and preferably 30 to 33%, and is, in some cases, 30.5 to 32.5%. In the sixth combination, (MgO+CaO) is 1% or more and less than 3.5%, preferably 1 to 3%, and more preferably 1 to 2.5%, and is 1.5 to 2.5% in some cases.

($Al_2O_3$)

$Al_2O_3$ is a component forming a network structure of glass. $Al_2O_3$ acts to enhance the chemical durability of the glass composition. On the other hand, $Al_2O_3$ makes the glass composition more likely to suffer devitrification during fiber formation. The $Al_2O_3$ content is preferably 5% or more, 7.5% or more, 8% or more, 9% or more, and more preferably 10% or more, and may be, in some cases, 10.5% or more, 12% or more, or 13% or more. The $Al_2O_3$ content is preferably 20% or less, 18% or less, 17% or less, and more preferably 15% or less, and may be, in some cases, 14% or less, even 13% or less, or 12.5% or less. An example of the $Al_2O_3$ content suitable for reliably controlling the devitrification temperature TL to fall within a range lower than the temperature T3 is 12.3% or less. $Al_2O_3$ is generally understood to be a component that increases the viscosity of a glass composition at melting. However, in a glass composition having a high value of $SiO_2+B_2O_3$, $Al_2O_3$ can act to distinctively decrease the viscosity at melting.

An example of a preferred range of the $Al_2O_3$ content is 8 to 12.5%, and particularly 10 to 12.5%. In the case where the above first to fourth combinations of the $SiO_2$ and $B_2O_3$ contents are employed, these ranges are particularly suitable.

Another example of the preferred range of the $Al_2O_3$ content is 13 to 17%. In the case where the above fifth combination of the $SiO_2$ and $B_2O_3$ contents is employed, the $Al_2O_3$ content is particularly suitably 13 to 17%. Still another example of the preferred range of the $Al_2O_3$ content is 12 to 15%. In the case where the sixth combination of the $SiO_2$ and $B_2O_3$ contents is employed, the $Al_2O_3$ content is particularly suitably 12 to 15%.

Alkali metal oxides are known as components acting to decrease the viscosity at melting, but an increase in content of such an alkali metal oxide increases the permittivity simultaneously. In contrast, in the preferred glass composition according to the present invention, $Al_2O_3$ acts to distinctively decrease the viscosity at melting, but its adverse effect of increasing the permittivity is slight.

(MgO)

MgO is an optional component that decreases the viscosity of the glass composition at melting to reduce inclusion of bubbles in the glass filler, thereby improving the homogeneity of the glass composition. The MgO content may be 0.1% or more, 0.2% or more, even 0.5% or more, or 0.6% or more, and may be, in some cases, 0.8% or more, or even 1% or more. The MgO content is preferably less than 10%, 8% or less, 7% or less, or 5% or less, and may be, in some cases, 3% or less, even 2% or less, or particularly 1.6% or less. To set the ratio to the CaO content within an appropriate range, the MgO content is sometimes preferably 1.7% or less, 1.5% or less, more preferably 1.2% or less, and 1% or less. However, depending on the content of additional components, the optimum MgO content is sometimes 2% or more, for example 2 to 8%, even 2 to 5%, or 3 to 5%. MgO has a great effect of decreasing the devitrification temperature, but does not increase the permittivity as much as an alkali metal oxide $R_2O$. Accordingly, it is preferable to add MgO in preference to $R_2O$, in other words, such that the MgO content is higher than the $R_2O$ content.

An example of a preferred range of the MgO content is 0.5 to 2%. In the case where the first to fourth combinations of the $SiO_2$ and $B_2O_3$ contents are employed, the MgO content is particularly suitably 0.5 to 2% and even 0.5 to 1.6%. In the case where the fifth combination of the $SiO_2$ and $B_2O_3$ contents is employed, the MgO content is particularly suitably 0.5 to 2% and even 1 to 2%. Another example of the preferred range of the MgO content is 0.1 to 1%. In the case where the sixth combination of the $SiO_2$ and $B_2O_3$ contents is employed, the MgO content is particularly suitably 0.1 to 1% and even 0.1% or more and less than 1%.

(CaO)

CaO is an optional component that improves the meltability of a glass raw material to decrease the viscosity of the glass composition at melting. The action of CaO is more significant than that of MgO. The CaO content may be 0.1% or more, 0.5% or more, or even 1% or more, and may be, in some cases, 1.5% or more, or even 2% or more. The CaO content is preferably less than 10%, 7% or less, and 5% or less, and may be, in some cases, 4% or less, 3.5% or less, 3% or less, or even 2.5% or less. CaO has a great effect of increasing the permittivity of the glass composition compared with MgO and ZnO. For the same reason as MgO, it is preferable to add CaO likewise in preference to an alkali metal oxide $R_2O$, in other words, such that the CaO content is higher than that the $R_2O$ content.

An example of a preferred range of the CaO content is 2 to 5%, and even 2 to 3.5%. In the case where the first to fifth combinations of the $SiO_2$ and $B_2O_3$ contents are employed, the CaO content is particularly suitably 2 to 5%. For the first to fourth combinations, 2 to 3.5% is more suitable. For the fifth combination, 2.5 to 5% is more suitable. Another example of the preferred range of the CaO content is 0.5 to 2%. In the case where the sixth combination of the $SiO_2$ and $B_2O_3$ contents is employed, the CaO content is particularly suitably 0.5 to 2%.

An example of a particularly preferred combination of the MgO content and the CaO content is a combination in which the MgO content is 1 to 2% and the CaO content is 2 to 5%. This combination is particularly suitable in the case where the fifth combination of the $SiO_2$ and $B_2O_3$ contents is employed.

(SrO)

SrO is also an optional component that improves the meltability of a glass raw material to decrease the viscosity of the glass composition at melting. However, SrO increases the permittivity of the glass composition compared with MgO and CaO, and accordingly it is desirable to limit the SrO content. The SrO content is preferably 1% or less, 0.5% or less, and more preferably 0.1% or less. The glass composition may be substantially free of SrO.

In the case where the first to fifth combinations of the $SiO_2$ and $B_2O_3$ contents are employed, the SrO content is particularly suitably 0.1% or less. In this case, the glass composition may be substantially free of SrO. However, there is a case where SrO may be added such that the SrO content is 0.1 to 5%, and even 1 to 3.5%. In the case where the sixth combination of the $SiO_2$ and $B_2O_3$ contents is employed, the SrO content is particularly suitably 0.1 to 5% and even 1 to 3.5%. In particularly the sixth combination, it has been found that SrO can effectively act to decrease the dielectric loss, in other words, to decrease the dielectric loss tangent, contrary to technical common sense of a person skilled in the art. In the sixth combination, SrO/CaO representing the ratio of the SrO content to the CaO content may exceed 1. In this case, CaO/MgO representing the ratio of the CaO content to the MgO content also may exceed 1.

(RO)

The RO content, that is, the total of the contents of MgO, CaO and SrO is preferably less than 15%, 12% or less, 10% or less, less than 10%, 9.5% or less, 8% or less, more preferably less than 7%, and particularly preferably 6% or less, and may be, in some cases, 5% or less, or even 4% or less. An excessively high RO content may insufficiently decrease the permittivity. Although the components constituting RO are each individually an optional component, it is preferable that at least one of the components should be contained, that is, the total of the contents of the components should exceed 0%. The RO content is preferably 1% or more, 1.5% or more, 2% or more, and more preferably 2.5% or more, and may be, in some cases, 3% or more, or even 3.5% or more.

A preferred example of a range of the RO content is 2 to 7%, and particularly 2 to 4%.

(MgO/RO)

MgO/RO, that is, the ratio of the MgO content to the RO content is preferably less than 0.8, and more preferably less than 0.7, and may be, in some cases, 0.5 or less, or 0.4 or less. When MgO/RO increases, the tendency for the glass composition to undergo phase separation becomes remarkable, and thus the homogeneity of the glass composition may be impaired. On the other hand, to decrease the permittivity of the glass composition, MgO/RO is preferably 0.1 or more, and more preferably 0.14 or more, and may be 0.19 or more in some cases. MgO/RO is preferably 0.1 to 0.5.

(MgO/(MgO+CaO))

MgO/(MgO+CaO), that is, the ratio of the MgO content to the total of the MgO and CaO contents may also fall within a range of any combination of the upper and lower limits described above for MgO/RO. MgO/(MgO+CaO) is preferably 0.1 to 0.5, and particularly preferably 0.1 to 0.4.

($Li_2O$)

$Li_2O$ is an optional component that, even when added in a small amount, acts to decrease the viscosity of the glass composition at melting to reduce inclusion of bubbles in the glass filler, and further acts to reduce devitrification. Also, addition of $Li_2O$ in an appropriate amount remarkably reduces the tendency for the glass composition to undergo phase separation. However, $Li_2O$ increases the permittivity of the glass composition although its action is relatively weaker than that of other $R_2O$. The $Li_2O$ content is preferably 1.5% or less, 1% or less, and 0.5% or less, and may be, in some cases, 0.4% or less, 0.3% or less, or even 0.2% or less. The $Li_2O$ content is preferably 0.01% or more, 0.03% or more, and more preferably 0.05% or more. An example of a preferred range of the $Li_2O$ content is 0.01 to 0.5%, and even 0.05 to 0.4%.

($Na_2O$)

$Na_2O$ is also an optional component that, even when added in a small amount, acts to decrease the viscosity of the glass composition at melting to reduce inclusion of bubbles in the glass filler, and further acts to reduce devitrification. From this viewpoint, the $Na_2O$ content may be 0.01% or more, 0.05% or more, or even 0.1% or more. However, addition of $Na_2O$ needs to be kept within a limited range so as not to increase the permittivity of the glass composition. The $Na_2O$ content is preferably 1.5% or less, 1% or less, 0.5% or less, and more preferably 0.4% or less, and may be, in some cases, 0.2% or less, even 0.15% or less, particularly 0.1% or less, 0.05% or less, or 0.01% or less. An example of a preferred range of the $Na_2O$ content is 0.01 to 0.4%.

($K_2O$)

$K_2O$ is also an optional component that, even when added in a small amount, acts to decrease the viscosity of the glass composition at melting to reduce inclusion of bubbles in the glass filler, and further acts to reduce devitrification. However, $K_2O$ significantly acts to increase the permittivity of the glass composition. The $K_2O$ content is preferably 1% or less, 0.5% or less, and 0.2% or less, and may be, in some cases, 0.1% or less, 0.05% or less, or 0.01% or less. The glass composition may be substantially free of $K_2O$.

($R_2O$)

The total of the $R_2O$ content and the $Li_2O$, $Na_2O$, and $K_2O$ contents is preferably 5% or less, 4% or less, 3% or less, 2% or less, and more preferably 1.5% or less, and may be, in some cases, 1% or less, even 0.6% or less, or 0.5% or less. Although the components constituting $R_2O$ are each individually an optional component, it is preferable that at least one of the components should be contained, that is, the total of the contents of the components should exceed 0%. The $R_2O$ content is preferably 0.03% or more, 0.05% or more, more preferably 0.1% or more, particularly preferably 0.15% or more, and 0.2% or more.

Further, in the case where the $Li_2O$ content is higher than the $Na_2O$ content, the tendency for the glass composition to undergo phase separation may be more effectively reduced. When the $Li_2O$ content is set to 0.25% or more or even 0.3% or more, the characteristic temperature sometimes can be adjusted to fall within a more preferred range. In particular, in the case where the first combination of the $SiO_2$ and $B_2O_3$ contents is employed, it is preferable to add $Li_2O$ such that the $Li_2O$ content is 0.25% or more or even 0.3% or more. In this case, $Na_2O$ may be added such that the $Na_2O$ content is 0.05% or more and less than the $Li_2O$ content.

(T-$Fe_2O_3$)

T-$Fe_2O_3$ is an optional component that improves the meltability of the glass raw material owing to its heat absorbing action, and improves the homogeneity of the glass composition at melting. The T-$Fe_2O_3$ content is preferably 0.01% or more, 0.02% or more, 0.05% or more, and more preferably 0.10% or more. The effect of improving the meltability is remarkably exhibited when the T-$Fe_2O_3$ content is 0.01% or more. Meanwhile, the effect of improving the homogeneity is particularly remarkably exhibited when the T-$Fe_2O_3$ content is 0.02% or more. For the purpose of, for example, reducing an excessive heat absorbing action exhibited by T-$Fe_2O_3$, the T-$Fe_2O_3$ content is preferably 0.5% or less, 0.3% or less, and more preferably 0.25% or less, and may be 0.20% or less in some cases. In the present specification, as is conventional, the amount of total iron oxide in the glass composition is expressed as a value obtained by converting iron oxides other than $Fe_2O_3$ such as FeO into $Fe_2O_3$, that is, as the T-$Fe_2O_3$ content. Accordingly, at least a portion of T-$Fe_2O_3$ may be contained as FeO. An example of a preferred range of the T-$Fe_2O_3$ content is 0.01 to 0.5%, and even 0.1 to 0.3%.

(ZnO)

ZnO is an optional component that improves the meltability of the glass raw material to decrease the viscosity of the glass composition at melting. However, ZnO increases the permittivity of the glass composition. The ZnO content is preferably 3.5% or less, 2% or less, 1% or less, and more preferably 0.5% or less. The glass composition may be substantially free of ZnO.

(Additional Components)

Example of components that can be contained in the glass composition, in addition to the above components, include $P_2O_5$, BaO, PbO, $TiO_2$, $ZrO_2$, $La_2O_3$, $Y_2O_3$, $MoO_3$, $WO_3$, $Nb_2O_5$, $Cr_2O_3$, $SnO_2$, $CeO_2$, $As_2O_3$, $Sb_2O_3$, and $SO_3$. Other components that can be contained in the glass composition include, for example, noble metal elements such as Pt, Rh, and Os, and, for example, halogen elements such as F and Cl. The allowable content of each of these components is preferably less than 2%, more preferably less than 1%, and particularly preferably less than 0.5%, and the total content of the components is preferably less than 5%, more preferably less than 3%, particularly preferably less than 2%, and more particularly preferably less than 1%. However, the glass composition may be substantially free of each of the above additional components. Although a minute amount of $TiO_2$ may be added for the reasons described below, the glass composition may be substantially free of $TiO_2$. The same applies to $ZrO_2$. In addition, it is preferable that the glass composition should be substantially free of BaO and PbO. It is also preferable that the glass composition should be substantially free of $P_2O_5$. This is because BaO and PbO have a great effect of increasing the permittivity of the glass composition, and $P_2O_5$ induces phase separation. The glass composition may be substantially free of components other than the components from $SiO_2$ to ZnO listed above. However, even in this case, the glass composition may contain components that are effective in facilitating refining at melting, preferably $SO_3$, F, and Cl that are each within a range less than 2%.

It has been found that addition of a minute amount of $TiO_2$ sometimes decreases the permittivity and the dielectric loss tangent of the glass composition, contrary to technical common sense of a person skilled in the art. From this viewpoint, the $TiO_2$ content may be more than 0% and 1% or less. In particular, in the case where the sixth combination of the $SiO_2$ and $B_2O_3$ contents is employed, $TiO_2$ may be added at a content of more than 0% and 1% or less.

(Example of Preferred Composition)

A glass composition according to a preferred embodiment includes the following components:

$40 \leq SiO_2 < 58$;

$25 \leq B_2O_3 \leq 40$;

$7.5 \leq Al_2O_3 \leq 18$;

$0 < R_2O \leq 4$;

$0 \leq Li_2O \leq 1.5$;

$0 \leq Na_2O \leq 1.5$;

$0 \leq K_2O \leq 1$;

$1 \leq RO < 10$;

$0 \leq MgO < 10$;

$0 \leq CaO < 10$;

$0 \leq SrO \leq 5$; and $0 \leq T\text{-}Fe_2O_3 \leq 0.5$.

In an embodiment including the above components, the following may be satisfied:

$7.5 \leq Al_2O_3 \leq 15$; and $0 \leq SrO \leq 1$.

A glass composition in which the following is added to the end of the above relationships is also another preferred embodiment:

$0 \leq ZnO \leq 3.5$.

The glass compositions of these embodiments preferably further satisfy $40 \leq SiO_2 < 55$. Also, the glass compositions may satisfy $SiO_2 + B_2O_3 \geq 80$, and may preferably further satisfy $SiO_2 + B_2O_3 + Al_2O_3 \leq 99.9$. MgO/RO<0.8, particularly MgO/RO<0.8 and $40 \leq SiO_2 < 55$ are also other conditions that the glass compositions of the above embodiments may satisfy.

[Properties of Glass Composition]

(Permittivity)

In a preferred embodiment, the permittivity of the glass composition at a measurement frequency of 1 GHz is 4.65 or less, 4.4 or less, 4.35 or less, 4.30 or less, 4.25 or less, or even 4.20 or less, and is 4.18 or less in some cases. The permittivity at a measurement frequency of 5 GHz is 4.63 or less, 4.4 or less, 4.31 or less, 4.27 or less, 4.22 or less, or even 4.17 or less, and is 4.15 or less in some cases. The permittivity at a measurement frequency of 10 GHz is 4.55 or less, 4.4 or less, 4.22 or less, 4.18 or less, 4.14 or less, or even 4.08 or less, and is 4.06 or less in some cases.

(Dielectric Loss Tangent: Tan δ)

In a preferred embodiment, the dielectric loss tangent of the glass composition at a measurement frequency of 1 GHz is 0.007 or less, 0.005 or less, 0.004 or less, or even 0.003 or less, and is 0.002 or less in some cases. The dielectric loss tangent at a measurement frequency of 1 GHz may be 0.001 or less, less than 0.001, 0.0009 or less, 0.0008 or less, or even 0.0007 or less. The dielectric loss tangent at a measurement frequency of 5 GHz is 0.007 or less, 0.005 or less, 0.004 or less, or even 0.003 or less, and is 0.002 or less in some cases. The dielectric loss tangent at a measurement frequency of 10 GHz is 0.007 or less, 0.006 or less, 0.005 or less, 0.004 or less, or even 0.003 or less, and is 0.002 or less in some cases.

(Characteristic Temperature)

In a preferred embodiment, T2 of the glass composition is 1700° C. or less, 1650° C. or less, 1640° C. or less, 1620° C. or less, or even 1610° C. or less, and is, in some cases, less than 1600° C., 1550° C. or less, even 1520° C. or less, or particularly 1510° C. or less. T2 is a temperature serving as the reference for the melting temperature of the glass melt. An excessively high T2 requires an extremely high temperature for melting the glass melt, and thus causes a high energy cost and a high cost of apparatuses resistant to high temperatures. When molten at the same temperature, a glass having a lower T2 has a lower viscosity of the melt, and accordingly is effective in refining and homogenizing the glass melt. Meanwhile, when molten at the same viscosity, a glass having a lower T2 can be molten at a lower temperature, and accordingly is suitable for mass production. T2.5 is preferably 1590° C. or less, 1550° C. or less, and more preferably 1500° C. or less, and is, in some cases, 1450° C. or less, or even 1400° C. or less. T3 is preferably 1450° C. or less, 1420° C. or less, 1400° C. or less, more preferably 1365° C. or less, and particularly preferably 1360° C. or less, and is, in some cases, 1330° C. or less, or even 1300° C. or less. T3 is a temperature serving as the reference for glass filler formation.

In a preferred embodiment, T3 of the glass composition is higher than the devitrification temperature TL. In addition, in a more preferred embodiment, T3 is higher than TL by 10° C. or more, by even 50° C. or more, and, in some cases, by 100° C. or more. In a preferred embodiment, T2.5 of the glass composition is higher than the devitrification temperature TL by 50° C. or more. In addition, in a more preferred embodiment, T2.5 is higher than TL by 100° C. or more. T3 and T2.5 that are sufficiently higher than TL significantly contribute to the stable production of a glass filler.

The fifth combination of the $SiO_2$ and $B_2O_3$ contents is particularly suitable for achieving a preferred characteristic temperature. The preferred characteristic temperature is, for example, T2 that is 1520° C. or less, particularly 1510° C. or less, and is also, for example, T3 that is 1300° C. or less and higher than TL. A glass composition having an $Li_2O$ content of 0.25% or more in the first combination of the $SiO_2$ and $B_2O_3$ contents is also suitable as much as the above for achieving the preferred characteristic temperature.

[Glass Filler]

(Form of Glass Filler)

The form of the glass filler is not particularly limited, and may fall under at least one selected from, for example, a glass flake, a chopped strand, a milled fiber, a glass powder, a glass bead, a flat fiber, and a flaky glass. Note that these forms are not strictly distinguished from each other. Further, two or more types of glass fillers having different forms may be used in combination as a filler. The form of the glass filler may be other than a glass fiber. Each of the forms will be described below.

Figure 1B:
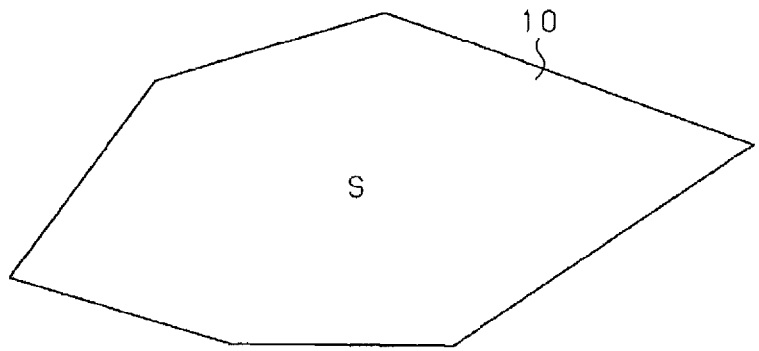
FIG. 1B is a plan view of the glass flake shown in FIG. 1A.

Glass flake is called also scaly glass, and has a flake-like shape. The average thickness of the glass flake is, for example, 0.1 to 15 µm. As shown in FIG. 1A, the thickness of the glass flake corresponds to a distance t between both principal surfaces of a glass flake 10. FIG. 1B shows the principal surface of the glass flake 10 having an area S. The average particle diameter is, for example, 0.2 to 15000 µm. The aspect ratio of the glass flake is, for example, 2 to 1000. The aspect ratio can be obtained by dividing the average particle diameter by the average thickness. The average thickness can be obtained by measuring the thickness t of 100 or more sheets of glass flakes with a scanning electron microscope (SEM) and calculating its average value. The average particle diameter of the glass flakes can be determined by a particle diameter (D50) at a cumulative volume percentage of 50% in particle size distribution measured by a laser diffraction scattering method.

Figure 2:
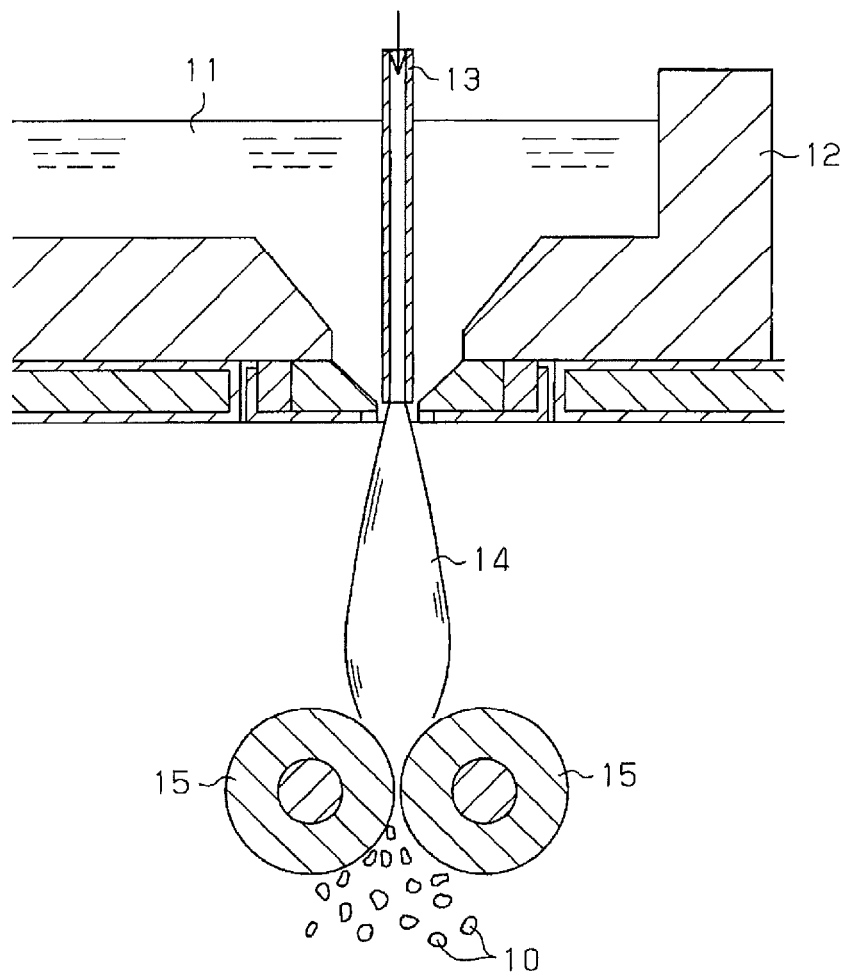
FIG. 2 is a cross-sectional view showing an example of an apparatus for producing glass flakes.

The glass flake can be obtained by a known blow process, cup process, or the like. FIG. 2 shows a producing apparatus using the blow process. In this apparatus, a raw glass 11 having a predetermined composition molten in a refractory furnace 12 is inflated into a balloon by a gas delivered through a blow nozzle 13, and thus a hollow glass film 14 is obtained. This hollow glass film 14 is crushed by a pair of pressing rolls 15, and thus the glass flakes 10 are obtained.

A chopped strand has a shape obtained by cutting a glass fiber into short pieces. The chopped strand has a fiber diameter of, for example, 1 to 50 µm, and have an aspect ratio of, for example, 2 to 1000. The aspect ratio of the chopped strand can be determined by dividing the fiber length by the fiber diameter. The chopped strand can be produced, for example, using the apparatuses shown in FIGS. 3 and 4.

Figure 3:
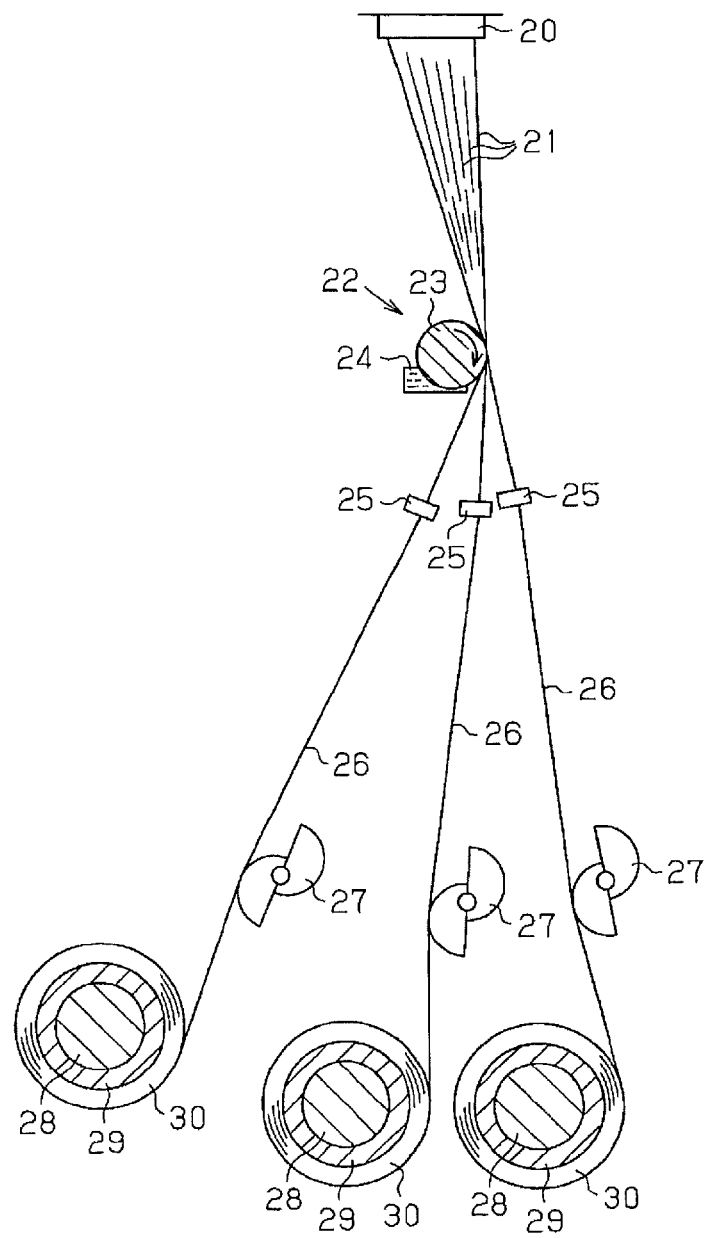
FIG. 3 is a cross-sectional view showing an example of an apparatus for producing chopped strands.

As shown in FIG. 3, a raw glass having a predetermined composition molten in a refractory furnace is drawn through a bushing 20 having a large number of (for example, 2400) nozzles in the bottom, and drawn out as a large number of glass filaments 21. The glass filaments 21 are sprayed with cooling water, and then a binder (sizing agent) 24 is applied to the glass filaments 21 by an application roller 23 of a binder applicator 22. The large number of glass filaments 21, to which the binder 24 is applied, are bundled, through reinforcing pads 25, into three strands 26 each composed of, for example, about 800 glass filaments 21. While being traversed by a traverse finger 27, each of the strands 26 is wound on a cylindrical tube 29 mounted on a collet 28. The cylindrical tube 29, on which the strand 26 is wound, is detached from the collet 28, and thus a cake (wound strand body) 30 is obtained.

Figure 4:
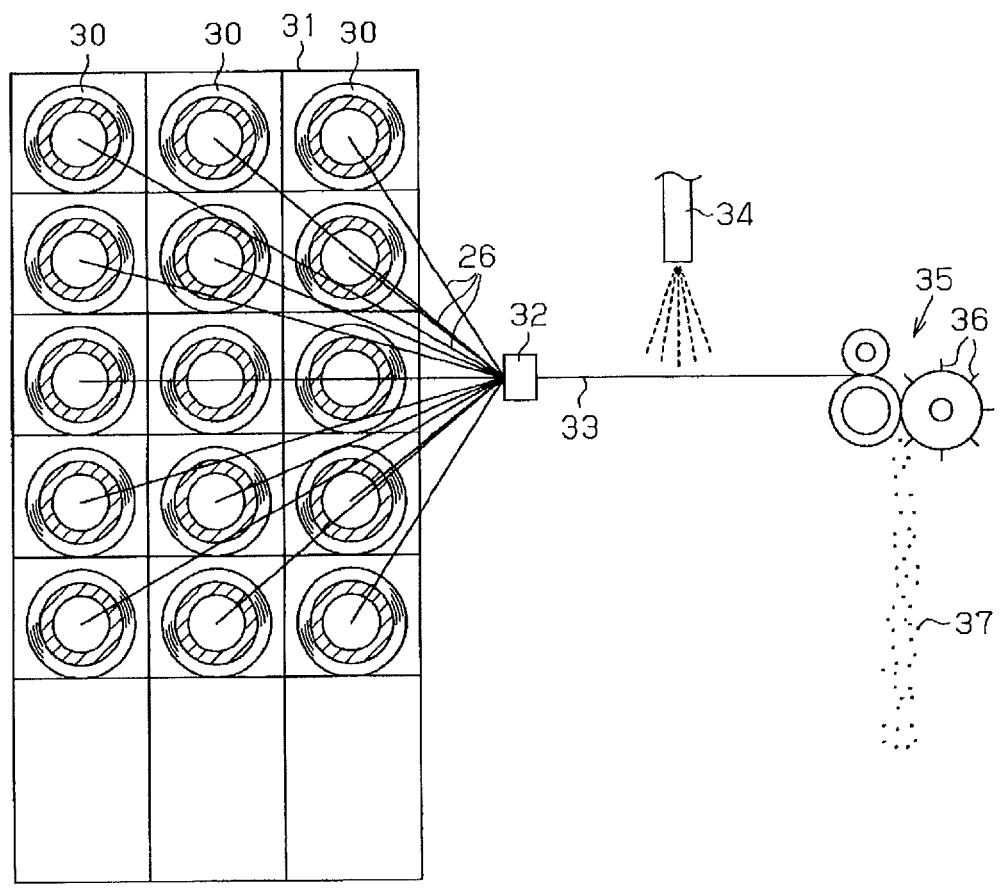
FIG. 4 is a cross-sectional view showing an example of an apparatus for producing chopped strands.

Next, as shown in FIG. 4, the cakes 30 are placed in a creel 31, and the strands 26 are drawn out from the cakes 30 and bundled into a strand bundle 33 through a bundle guide 32. The strand bundle 33 is sprayed with water or a treatment liquid by a spraying apparatus 34. The strand bundle 33 is cut by rotating blades 36 of a cutting apparatus 35, and thus chopped strands 37 are obtained.

A milled fiber has a shape obtained by cutting a glass fiber into powder. The milled fiber has a fiber diameter of, for example, 1 to 50 µm and have an aspect ratio of, for example, 2 to 500. The aspect ratio of the milled fiber can be obtained by dividing the fiber length by the fiber diameter. The milled fiber can be obtained by a known method.

A glass powder is powdery glass, and is produced by crushing glass. The average particle diameter of the glass powder is, for example, 1 to 500 µm. The particle diameter of the glass powder is defined as the diameter of a sphere having the same volume as a particle of the glass powder. The glass powder can be obtained by a known method.

A glass bead has a spherical shape or a substantially spherical shape. The average particle diameter of the glass bead is, for example, 1 to 500 µm. The particle diameter of the glass bead is defined as the diameter of a sphere having the same volume as a particle of the glass bead. The glass bead can be obtained by a known method.

Figure 5:
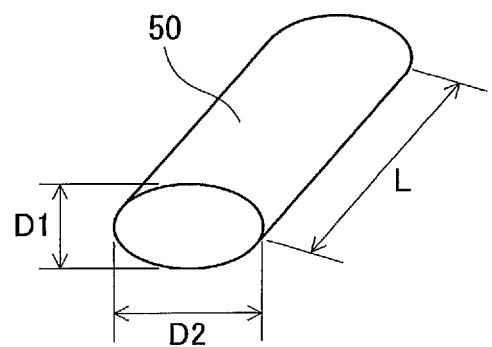
FIG. 5 is a perspective view showing an example of a flat fiber.
Figure 6:
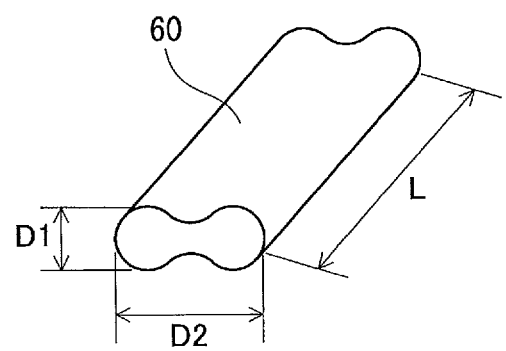
FIG. 6 is a perspective view showing another example of a flat fiber.

A flat fiber has a shape obtained by cutting a glass fiber having a cross section with a flat shape such as an ellipse. As shown in FIG. 5, a major axis D2 is larger than a minor axis D1 in the cross section of the flat fiber, and D2/D1 is, for example, 1.2 or more. The minor axis D1 is, for example, 0.5 to 25 μm. The major axis D2 is, for example, 0.6 to 300 μm. A length L of the flat fiber is, for example, 10 to 1000 μm. The flat fiber can be obtained by a known method. As shown in FIG. 6, the cross-sectional shape of the flat fiber may have a recessed shape in which a surface extending along the major axis D2 recedes in a central portion compared to end portions.

A flaky glass is a thin glass flake. The flaky glass may be formed of, for example, a glass flake having an average thickness of 0.1 to 2.0 μm, or may contain, for example, a glass flake having a thickness of 0.01 to 2.0 μm in an amount of 90 mass % or more. The flaky glass having such a small average thickness and having a small variation in thickness exhibits a high effect of reinforcing resins and also exhibits an excellent effect of reducing the mold shrinkage factor of resins.

The flaky glass is also suitable for alleviating the limitation on, for example, the thickness of a resin shaped body more than before. The flaky glass is formed of a glass flake having an average thickness of preferably 0.1 to 1.0 μm. The flaky glass contains a glass flake having a thickness of preferably 0.05 to 1.0 μm in an amount of 90 mass % or more. The flaky glass can be obtained by the above-described method.

(Granulation of Glass Filler)

At least a portion of the glass filler may be granulated. Granulation is a process in which a glass filler is subjected to a binder treatment such that individual glass fillers are bonded to each other by a binder to be granulated. Granular glass flakes hardly scatter and accordingly is excellent in workability, and is also excellent in dispersibility in resins. The use of granular glass flakes improves the feeding efficiency, thereby allowing more reliable quantitative feeding. The binder for use in granulation will be described below.

Preferably, the binder contains a surfactant and a binding component. The surfactant may be either anionic, cationic, amphoteric, or nonionic. However, in the case where the binding component contains an epoxy resin or a urethane resin, the use of a nonionic surfactant is preferred. This is because agglomeration of the binder can be reduced for stabilization. Examples of an anionic surfactant include dioctyl sodium sulfosuccinate, fatty acid salt, alkyl sulfate, alkyl sulfonate, alkyl aryl sulfonate, alkyl naphthalene sulfonate, alkyl sulfosuccinate, alkyl diphenyl ether disulfonate, alkyl phosphate, polyoxyethylene alkyl sulfate, polyoxyethylene alkyl allyl sulfate, and sulfosuccinate. Examples of a cationic surfactant include higher amine halogen acid salt, alkyl pyridinium halide, and quaternary ammonium salt. Examples of an amphoteric surfactant include lauryl amino propionate and lauryl dimethyl betaine. Examples of a nonionic surfactant include: polyoxyethylene glycol alkyl ethers such as polyoxyethylene lauryl ether, polyoxyethylene higher alcohol ether, and polyoxyethylene octyl phenyl ether; polyethylene glycol fatty acid esters such as polyethylene glycol monostearate; sorbitan fatty acid esters such as sorbitan monolaurate and polyoxyethylene sorbitan monolaurate; glycol fatty acid esters such as glycol monostearate; and fatty acid monoglycerides. Two or more of these may be used in combination.

The binding component of the binder is not particularly limited, and an organic or inorganic component can be used. Examples of the organic binding component include methylcellulose, carboxymethyl cellulose, starch, carboxymethyl starch, hydroxyethyl cellulose, hydroxypropyl cellulose, polyvinyl alcohol, silane coupling agents, acrylic resins, epoxy resins, phenolic resins, vinyl acetate, and urethane resins. Examples of the inorganic binding component include liquid glass, colloidal silica, colloidal alumina, and amino silane. The binding component preferably contains at least one selected from silane coupling agents, epoxy resins, and urethane resins. The silane coupling agents have two or more types of reactive groups in a molecule, one of which reacts with the surface of a glass flake, and another one of which reacts with an organic binding component and a thermoplastic resin. Accordingly, the affinity between the glass flakes and the thermoplastic resin is improved. Epoxy resins and urethane resins have a good affinity for silane coupling agents and thermoplastic resins.

The concentration of the binder is preferably adjusted using water or an alcohol as a solvent such that the respective components can be uniformly present on the surface of a glass filler. The concentration of the binder is preferably 1 to 10 mass % in terms of total solid concentration. The binder can be produced by, for example, appropriately adding a binding component, a surfactant, and the like to a solvent at ordinary temperature and atmospheric pressure and stirring the resultant solution to homogeneity.

The ratio of the binder, in other words, the deposit ratio of the binder, in the granulated glass filler is, for example, 0.1 to 2 mass % in terms of solid content mass ratio. A deposit ratio of 0.1 mass % or more is suitable for sufficiently reducing scattering of the glass filler. A deposit ratio of 2 mass % or less is suitable for reducing gas generation and thus discoloration of the resin composition at extrusion molding of the resin composition.

The method for granulating the glass filler is not particularly limited, and for example, stirring granulation, fluidized bed granulation, injection granulation, or rotary granulation can be used. Specifically, according to an applicable method, glass fillers onto which an appropriate amount of the binder is deposited with a spray or the like are spread in a rotating drum or on a vibrating tray, and the glass fillers are granulated while being heated to evaporate a solvent. By appropriately adjusting the rotational rate of the rotating drum or the vibration frequency of the vibration tray, and even the evaporation rate of the solvent, granular glass fillers having a desired size can be produced.

The glass filler may have a surface subjected to a surface treatment with a surface treatment agent. This treatment may improve the reinforcing effect of the glass filler. Examples of the surface treatment agent include silicon coupling agents such as γ-aminopropyltriethoxysilane, vinyltriethoxysilane, and γ-methacryloxypropyltrimethoxysilane, and titanium coupling agents. The use amount of the surface treatment agent is, for example, 0.05 to 0.20 mass % of the glass filler.

(Method for Producing Glass Filler)

The glass filler is produced by a method including: melting the above-described glass composition; and forming the molten glass composition into a desired glass filler. The temperature for melting the glass composition is, for example, 1400° C. or more.

The glass filler also can be produced by a method including: melting a glass raw material, the glass raw material being prepared such that a glass composition constituting the glass filler is obtained from the glass raw material; and forming the glass raw material being molten into the glass filler. The temperature for melting the glass raw material is, for example, 1400° C. or more.

[Resin Composition]

The resin composition according to the present invention includes a thermoplastic resin as well as the glass filler according to the present invention. The thermoplastic resin is not particularly limited, and is, for example, polyvinyl chloride, polypropylene, polyethylene, polystyrene, polyester, polyimide, polycarbonate, polybutylene, polybutylene terephthalate, or a copolymer of these. The use of polybutylene terephthalate exhibits a significant effect on improvement of reduction in warpage of a molded article caused by mixing with glass fillers and improvement of dimensional stability.

The content of glass fillers such as glass flakes in the resin composition is preferably 5 to 70 mass %. Setting the content to 5 mass % or more facilitates the glass fillers to sufficiently exhibit their function as a reinforcement. Setting the content to 70 wt % or less facilitates the glass fillers to be uniformly dispersed in the resin composition. To sufficiently reduce the mold shrinkage factor, the content of the glass fillers is more preferably 30 mass % or more.

The resin composition may appropriately contain a reinforcement other than the glass fillers. For example, in applications requiring a high strength, glass fibers may be contained. In this case, the glass fibers may be added at a content nearly equal to that of the glass fillers.

Glass flakes, flat fibers, and flaky glass have relatively large specific surface areas, and are suitable for ensuring the adhesive force with thermoplastic resins. From this viewpoint, the flat fiber shown in FIG. 6 is preferable owing to its recessed surface shape contributing to an increase in specific surface area.

The resin composition according to the present invention has a low permittivity, and is suitable for improvement in various properties, such as enhancement in strength, heat resistance, and dimensional stability, decrease in linear thermal expansion coefficient and reduction in its anisotropy, and reduction in anisotropy of the shrinkage factor at molding.

EXAMPLES

Hereinafter, the present invention will be described in more detail by Examples. The present invention is not limited to the following Examples.

Glass raw materials were weighed to give each composition shown in Tables 1 to 6 (the contents of the components are expressed in wt %), and were mixed to homogeneity. Thus, a glass raw material mixture batch was produced. Next, the produced mixture batch was introduced into a crucible made of platinum-rhodium alloy, and heated in an indirect-heating electric furnace set at 1600° C. in an air atmosphere for 3 hours or more to obtain a molten glass. Next, the obtained molten glass was poured into a fire-resistant mold to be cast-molded. The resulting shaped body was then cooled slowly to room temperature by an annealing furnace to obtain glass composition samples to be used for evaluation.

The glass samples thus produced were evaluated for the characteristic temperatures T2, T2.5, and T3, the devitrification temperature TL, and the permittivity and the dielectric loss tangent at frequencies of 1 GHz, 5 GHz, and 10 GHz. The evaluation method is as follows.

(Characteristic Temperature)

The viscosity was measured by a platinum ball-drawing method, and respective temperatures at which the viscosity was $10^2$ d·Pas, $10^{2.5}$ d·Pas, and $10^3$ d·Pas were determined as T2, T2.5, and T3, respectively.

(Devitrification Temperature)

The glass specimens were each crushed into particles, and the particles were sieved to obtain particles passing through a sieve with an aperture size of 2.83 mm and remaining in a sieve with an aperture size of 1.00 mm. The particles were washed to remove fine powder deposited on the particles, and dried to prepare a sample for devitrification temperature measurement. In a platinum boat (a lidless rectangular platinum container), 25 g of the sample for devitrification temperature measurement was put to have a substantially uniform thickness. After being held in a temperature-gradient furnace for 2 hours, the sample was taken out of the furnace. The highest temperature at which devitrification was observed inside the glass was determined as the devitrification temperature.

(Water Resistance Test)

A water resistance test was performed based on an elution test according to Japan Optical Glass Industrial Standard JOGIS 06:1999 "Measurement Method (Powder Method) for Chemical Durability of Optical Glass". The test was specifically performed as follows. The glass specimens were each crushed into particles, and the particles were sieved to obtain particles passing through a sieve with an aperture size of 600 μm and remaining in a sieve with an aperture size of 425 μm. The particles were washed with methanol to remove fine powder deposited on the particles, and dried to prepare a sample for water resistance test. A weight g equal to the specific gravity of the sample for water resistance test was weighed in a round-bottom flask, 80 ml of pure water was added, a plug was placed and held at a temperature of 99° C. or more for 1 hour. An elution treatment was thus performed. The sample after the elution treatment was washed with methanol, and the sample remaining after drying was weighed, and the weight loss was calculated in percentage.

(Permittivity and Dielectric Loss Tangent)

The permittivity (dielectric constant) and the dielectric loss tangent at the respective frequencies were measured using a permittivity measuring apparatus by a cavity resonator perturbation method. The measurement temperature was set to 25° C., and the dimensions of the sample for measurement were set to a rectangular parallelepiped with a length of 10 cm having a square bottom surface of side 1.5 cm.

The glass compositions of Examples 1 to 44 and 48 to 96 had a permittivity of 4.65 or less at a measurement frequency of 1 GHz, and had T2 of 1700° C. or less and T3 of 1450° C. or less. Some of these glass compositions had a permittivity of 4.4 or less at a measurement frequency of 1 GHz, and the glass compositions of Examples 1 to 43, 48 to 81, 83 to 84, and 93 to 96 had a permittivity of 4.36 or less at a measurement frequency of 1 GHz. The glass compositions of Examples 1 to 41, 48 to 81, 83 to 84, and 93 to 96 had a permittivity of 4.35 or less at a measurement frequency of 1 GHz. Further, the glass compositions of Examples 5 to 6, 66 to 67, and 83 to 92 had T2 of 1520° C. or less and T3 of 1300° C. or less that were higher than TL. The glass compositions of Examples 66 to 67 and 83 to 92 had a $B_2O_3$ content of 35% or less, or 30% or less in some cases, and had T2 of 1520° C. or less and T3 of 1300° C. or less that were higher than TL. The glass compositions of Examples 2 and 93 to 96 had a dielectric loss tangent of less than 0.001 at a frequency of 1 GHz. The glass compositions of Examples 93 to 96 had a dielectric loss tangent of less than 0.001 at a frequency of 1 GHz, and had T2 of less than 1600° C. The glass compositions of Examples 45 to 47 are comparative examples, and Example 45 had T2 of more than 1700° C. and Examples 46 to 47 had a permittivity of more than 4.7 at a measurement frequency of 1 GHz.

TABLE 1

| Sample No./wt % | 1 | 2 | 3 | 4 | 5 | 6 | 7 | 8 |
|---|---|---|---|---|---|---|---|---|
| $SiO_2$ | 55.01 | 55.20 | 57.01 | 53.21 | 46.21 | 48.01 | 51.21 | 51.21 |
| $B_2O_3$ | 33.00 | 33.00 | 32.00 | 32.00 | 38.00 | 38.00 | 34.50 | 36.40 |
| $Al_2O_3$ | 6.00 | 6.00 | 5.00 | 5.00 | 7.00 | 7.00 | 7.00 | 8.00 |
| $Li_2O$ | 0.09 | 0.09 | 0.90 | 0.09 | 0.09 | 0.09 | 0.09 | 0.09 |
| $Na_2O$ | 0.09 | 0.09 | 0.30 | 0.09 | 0.09 | 0.09 | 0.09 | 0.09 |
| $K_2O$ | 0.00 | 0.00 | 0.00 | 0.00 | 0.00 | 0.00 | 0.00 | 0.00 |
| MgO | 4.17 | 4.11 | 2.05 | 6.87 | 5.87 | 4.07 | 4.37 | 1.47 |
| CaO | 1.45 | 1.45 | 2.55 | 2.55 | 2.55 | 2.55 | 2.55 | 2.55 |
| SrO | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 |
| $Fe_2O_3$ | 0.19 | 0.06 | 0.19 | 0.19 | 0.19 | 0.19 | 0.19 | 0.19 |
| $SiO_2 + B_2O_3 + Al_2O_3$ | 94.0 | 94.2 | 94.0 | 90.2 | 91.2 | 93.0 | 92.7 | 95.6 |
| $SiO_2 + B_2O_3$ | 88.0 | 88.2 | 89.0 | 85.2 | 84.2 | 86.0 | 85.7 | 87.6 |
| $(SiO_2 + B_2O_3 + Al_2O_3)/(SiO_2 + B_2O_3)$ | 1.07 | 1.07 | 1.06 | 1.06 | 1.08 | 1.08 | 1.08 | 1.09 |
| RO | 5.6 | 5.6 | 4.6 | 9.4 | 8.4 | 6.6 | 6.9 | 4.0 |
| $R_2O$ | 0.2 | 0.2 | 1.2 | 0.2 | 0.2 | 0.2 | 0.2 | 0.2 |
| MgO/RO | 0.74 | 0.74 | 0.45 | 0.73 | 0.70 | 0.61 | 0.63 | 0.37 |
| T2 (° C.) | 1617 | 1615 | 1639 | 1569 | 1465 | 1511 | 1555 | 1581 |
| T2.5 (° C.) | 1469 | 1471 | 1496 | 1416 | 1322 | 1368 | 1410 | 1441 |
| T3 (° C.) | 1348 | 1352 | 1363 | 1300 | 1218 | 1259 | 1297 | 1325 |
| Devitrification temperature TL (° C.) | <1160 | <1160 | <1160 | <1160 | <1160 | <1160 | <1160 | 1059 |
| Permittivity (1 GHz) | 4.08 | 4.07 | 4.19 | 4.33 | 4.31 | 4.18 | 4.21 | 4.03 |
| Dielectric loss tangent (1 GHz) | 0.0011 | 0.0008 | 0.0022 | 0.0010 | 0.0018 | 0.0018 | 0.0014 | 0.0016 |
| Permittivity (5 GHz) | 4.05 | 4.04 | 4.16 | 4.31 | 4.28 | 4.15 | 4.18 | 3.99 |
| Dielectric loss tangent (5 GHz) | 0.0009 | 0.0008 | 0.0005 | 0.0014 | 0.0010 | 0.0007 | 0.0011 | 0.0019 |
| Permittivity (10 GHz) | 3.95 | 3.94 | 4.06 | 4.22 | 4.19 | 4.05 | 4.09 | 3.89 |
| Dielectric loss tangent (10 GHz) | 0.0013 | 0.0011 | 0.0009 | 0.0007 | 0.0014 | 0.0012 | 0.0005 | 0.0023 |

| Sample No./wt % | 9 | 10 | 11 | 12 | 13 | 14 | 15 |
|---|---|---|---|---|---|---|---|
| $SiO_2$ | 51.91 | 51.20 | 51.91 | 50.75 | 50.88 | 51.72 | 52.39 |
| $B_2O_3$ | 31.00 | 31.00 | 31.00 | 34.88 | 33.91 | 33.34 | 31.88 |
| $Al_2O_3$ | 13.30 | 14.70 | 12.50 | 10.84 | 10.87 | 11.63 | 11.67 |
| $Li_2O$ | 0.30 | 0.30 | 0.30 | 0.09 | 0.09 | 0.09 | 0.09 |
| $Na_2O$ | 0.09 | 0.09 | 0.09 | 0.09 | 0.09 | 0.09 | 0.09 |
| $K_2O$ | 0.00 | 0.00 | 0.00 | 0.00 | 0.00 | 0.00 | 0.00 |
| MgO | 0.66 | 1.22 | 1.46 | 0.61 | 0.77 | 1.23 | 1.54 |
| CaO | 2.55 | 1.30 | 2.55 | 2.55 | 3.20 | 1.71 | 2.14 |
| SrO | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $Fe_2O_3$ | 0.19 | 0.19 | 0.19 | 0.19 | 0.19 | 0.19 | 0.20 |
| $SiO_2 + B_2O_3 + Al_2O_3$ | 96.2 | 96.9 | 95.4 | 96.5 | 95.7 | 96.7 | 95.9 |
| $SiO_2 + B_2O_3$ | 82.9 | 82.2 | 82.9 | 85.6 | 84.8 | 85.1 | 84.3 |
| $(SiO_2 + B_2O_3 + Al_2O_3)/(SiO_2 + B_2O_3)$ | 1.16 | 1.18 | 1.15 | 1.13 | 1.13 | 1.14 | 1.14 |
| RO | 3.2 | 2.5 | 4.0 | 3.2 | 4.0 | 2.9 | 3.7 |
| $R_2O$ | 0.4 | 0.4 | 0.4 | 0.2 | 0.2 | 0.2 | 0.2 |
| MgO/RO | 0.21 | 0.48 | 0.36 | 0.19 | 0.19 | 0.42 | 0.42 |
| T2 (° C.) | 1563 | 1536 | 1558 | 1557 | 1570 | 1571 | 1579 |
| T2.5 (° C.) | 1437 | 1416 | 1430 | 1432 | 1436 | 1440 | 1447 |
| T3 (° C.) | 1329 | 1312 | 1321 | 1325 | 1326 | 1331 | 1338 |
| Devitrification temperature TL (° C.) | 1317 | 1442 | 1191 | 1277 | <1160 | 1324 | 1250 |
| Permittivity (1 GHz) | 4.22 | 4.20 | 4.25 | 4.07 | 4.14 | 4.07 | 4.14 |
| Dielectric loss tangent (1 GHz) | 0.0019 | 0.0020 | 0.0019 | 0.0018 | 0.0017 | 0.0017 | 0.0016 |
| Permittivity (5 GHz) | 4.19 | 4.17 | 4.23 | 4.04 | 4.11 | 4.04 | 4.11 |
| Dielectric loss tangent (5 GHz) | 0.0029 | 0.0031 | 0.0024 | 0.0027 | 0.0024 | 0.0024 | 0.0021 |
| Permittivity (10 GHz) | 4.10 | 4.08 | 4.13 | 3.93 | 4.01 | 3.94 | 4.02 |
| Dielectric loss tangent (10 GHz) | 0.0034 | 0.0036 | 0.0028 | 0.0031 | 0.0029 | 0.0029 | 0.0025 |

TABLE 2

| Sample No./wt % | 16 | 17 | 18 | 19 | 20 | 21 | 22 | 23 | 24 |
|---|---|---|---|---|---|---|---|---|---|
| $SiO_2$ | 52.15 | 50.87 | 51.72 | 51.70 | 53.81 | 53.00 | 52.50 | 50.04 | 50.02 |
| $B_2O_3$ | 31.86 | 34.96 | 33.33 | 33.33 | 31.91 | 31.00 | 31.42 | 33.93 | 37.12 |
| $Al_2O_3$ | 11.99 | 10.86 | 11.62 | 11.62 | 10.90 | 12.00 | 12.14 | 12.10 | 9.32 |

TABLE 2-continued

| | | | | | | | | | |
|---|---|---|---|---|---|---|---|---|---|
| Li$_2$O | 0.20 | 0.09 | 0.07 | 0.05 | 0.05 | 0.20 | 0.10 | 0.10 | 0.09 |
| Na$_2$O | 0.10 | 0.09 | 0.14 | 0.19 | 0.19 | 0.10 | 0.13 | 0.13 | 0.09 |
| K$_2$O | 0.00 | 0.00 | 0.00 | 0.00 | 0.00 | 0.00 | 0.00 | 0.00 | 0.00 |
| MgO | 1.50 | 1.23 | 1.23 | 1.22 | 1.23 | 1.50 | 0.53 | 0.53 | 0.61 |
| CaO | 2.00 | 1.71 | 1.70 | 1.70 | 1.71 | 2.00 | 2.98 | 2.97 | 2.56 |
| SrO | 0.00 | 0.00 | 0.00 | 0.00 | 0.00 | 0.00 | 0.00 | 0.00 | 0.00 |
| TiO$_2$ | 0.00 | 0.00 | 0.00 | 0.00 | 0.00 | 0.00 | 0.00 | 0.00 | 0.00 |
| Fe$_2$O$_3$ | 0.20 | 0.19 | 0.19 | 0.20 | 0.19 | 0.20 | 0.20 | 0.20 | 0.19 |
| SiO$_2$ + B$_2$O$_3$ + Al$_2$O$_3$ | 96.0 | 96.7 | 96.7 | 96.6 | 96.6 | 96.0 | 96.1 | 96.1 | 96.4 |
| SiO$_2$ + B$_2$O$_3$ | 84.0 | 85.8 | 85.0 | 85.0 | 85.7 | 84.0 | 83.9 | 84.0 | 87.1 |
| (SiO$_2$ + B$_2$O$_3$ + Al$_2$O$_3$)/(SiO$_2$ + B$_2$O$_3$) | 1.14 | 1.13 | 1.14 | 1.14 | 1.13 | 1.14 | 1.15 | 1.14 | 1.11 |
| RO | 3.5 | 2.9 | 2.9 | 2.9 | 2.9 | 3.5 | 3.5 | 3.5 | 3.2 |
| R$_2$O | 0.3 | 0.2 | 0.2 | 0.2 | 0.2 | 0.3 | 0.2 | 0.2 | 0.2 |
| MgO/RO | 0.43 | 0.42 | 0.42 | 0.42 | 0.42 | 0.43 | 0.15 | 0.15 | 0.19 |
| T2 (° C.) | 1560 | 1562 | 1570 | 1571 | 1594 | 1568 | 1592 | 1553 | 1566 |
| T2.5 (° C.) | 1428 | 1431 | 1437 | 1440 | 1462 | 1445 | 1461 | 1424 | 1431 |
| T3 (° C.) | 1320 | 1321 | 1329 | 1331 | 1350 | 1340 | 1351 | 1317 | 1318 |
| Devitrification temperature TL (° C.) | 1290 | 1295 | 1309 | 1329 | 1312 | 1280 | 1308 | 1310 | 1218 |
| Permittivity (1 GHz) | 4.17 | 4.04 | 4.07 | 4.07 | 4.06 | 4.17 | 4.17 | 4.15 | 4.01 |
| Dielectric loss tangent (1 GHz) | 0.0018 | 0.0018 | 0.0017 | 0.0017 | 0.0012 | 0.0017 | 0.0017 | 0.0020 | 0.0019 |
| Permittivity (5 GHz) | 4.13 | 4.01 | 4.04 | 4.04 | 4.02 | 4.14 | 4.14 | 4.12 | 3.97 |
| Dielectric loss tangent (5 GHz) | 0.0023 | 0.0025 | 0.0022 | 0.0020 | 0.0016 | 0.0022 | 0.0024 | 0.0027 | 0.0026 |
| Permittivity (10 GHz) | 4.04 | 3.91 | 3.91 | 3.94 | 3.92 | 4.04 | 4.04 | 4.02 | 3.87 |
| Dielectric loss tangent (10 GHz) | 0.0028 | 0.0029 | 0.0020 | 0.0024 | 0.0021 | 0.0022 | 0.0028 | 0.0032 | 0.0031 |

| Sample No./wt % | 25 | 26 | 27 | 28 | 29 | 30 | 31 |
|---|---|---|---|---|---|---|---|
| SiO$_2$ | 51.00 | 51.74 | 49.76 | 52.10 | 49.51 | 51.26 | 49.28 |
| B$_2$O$_3$ | 36.12 | 33.87 | 35.89 | 32.76 | 37.45 | 34.17 | 36.20 |
| Al$_2$O$_3$ | 9.33 | 10.85 | 10.82 | 11.61 | 7.84 | 9.38 | 9.36 |
| Li$_2$O | 0.09 | 0.09 | 0.09 | 0.09 | 0.09 | 0.09 | 0.09 |
| Na$_2$O | 0.09 | 0.09 | 0.09 | 0.09 | 0.10 | 0.10 | 0.09 |
| K$_2$O | 0.00 | 0.00 | 0.00 | 0.00 | 0.00 | 0.00 | 0.00 |
| MgO | 0.61 | 0.61 | 0.61 | 0.61 | 0.93 | 0.93 | 0.92 |
| CaO | 2.57 | 2.56 | 2.55 | 2.55 | 3.88 | 3.87 | 3.86 |
| SrO | 0.00 | 0.00 | 0.00 | 0.00 | 0.00 | 0.00 | 0.00 |
| TiO$_2$ | 0.00 | 0.00 | 0.00 | 0.00 | 0.00 | 0.00 | 0.00 |
| Fe$_2$O$_3$ | 0.19 | 0.19 | 0.19 | 0.19 | 0.20 | 0.20 | 0.20 |
| SiO$_2$ + B$_2$O$_3$ + Al$_2$O$_3$ | 96.4 | 96.4 | 96.5 | 96.5 | 94.8 | 94.8 | 94.8 |
| SiO$_2$ + B$_2$O$_3$ | 87.1 | 85.6 | 85.6 | 84.8 | 87.0 | 85.4 | 85.5 |
| (SiO$_2$ + B$_2$O$_3$ + Al$_2$O$_3$)/(SiO$_2$ + B$_2$O$_3$) | 1.11 | 1.13 | 1.13 | 1.14 | 1.09 | 1.11 | 1.11 |
| RO | 3.2 | 3.2 | 3.2 | 3.2 | 4.8 | 4.8 | 4.8 |
| R$_2$O | 0.2 | 0.2 | 0.2 | 0.2 | 0.2 | 0.2 | 0.2 |
| MgO/RO | 0.19 | 0.19 | 0.19 | 0.19 | 0.19 | 0.19 | 0.19 |
| T2 (° C.) | 1581 | 1583 | 1552 | 1584 | 1567 | 1585 | 1554 |
| T2.5 (° C.) | 1445 | 1450 | 1421 | 1453 | 1427 | 1447 | 1417 |
| T3 (° C.) | 1331 | 1338 | 1312 | 1342 | 1313 | 1333 | 1306 |
| Devitrification temperature TL (° C.) | 1218 | 1276 | 1277 | 1305 | <1160 | <1160 | <1160 |
| Permittivity (1 GHz) | 4.01 | 4.07 | 4.06 | 4.10 | 4.09 | 4.16 | 4.15 |
| Dielectric loss tangent (1 GHz) | 0.0018 | 0.0017 | 0.0019 | 0.0016 | 0.0018 | 0.0017 | 0.0019 |
| Permittivity (5 GHz) | 3.98 | 4.04 | 4.03 | 4.07 | 4.06 | 4.13 | 4.12 |
| Dielectric loss tangent (5 GHz) | 0.0025 | 0.0025 | 0.0028 | 0.0025 | 0.0021 | 0.0020 | 0.0023 |
| Permittivity (10 GHz) | 3.88 | 3.94 | 3.93 | 3.97 | 3.96 | 4.03 | 4.02 |
| Dielectric loss tangent (10 GHz) | 0.0030 | 0.0030 | 0.0033 | 0.0030 | 0.0026 | 0.0025 | 0.0028 |

TABLE 3

| Sample No./wt % | 32 | 33 | 34 | 35 | 36 | 37 | 38 | 39 | 40 |
|---|---|---|---|---|---|---|---|---|---|
| SiO$_2$ | 51.12 | 51.87 | 49.89 | 50.65 | 49.23 | 55.30 | 56.50 | 57.45 | 52.83 |
| B$_2$O$_3$ | 35.15 | 32.90 | 34.92 | 35.46 | 42.56 | 28.25 | 29.17 | 26.36 | 30.54 |
| Al$_2$O$_3$ | 9.36 | 10.88 | 10.85 | 7.87 | 6.23 | 11.20 | 12.37 | 12.22 | 13.11 |
| Li$_2$O | 0.09 | 0.09 | 0.09 | 0.09 | 0.09 | 0.10 | 0.09 | 0.10 | 0.09 |
| Na$_2$O | 0.09 | 0.09 | 0.09 | 0.09 | 0.10 | 0.09 | 0.14 | 0.14 | 0.09 |
| K$_2$O | 0.00 | 0.00 | 0.00 | 0.00 | 0.00 | 0.00 | 0.00 | 0.00 | 0.00 |
| MgO | 0.77 | 0.77 | 0.77 | 1.09 | 0.31 | 0.54 | 0.31 | 0.53 | 0.61 |
| CaO | 3.22 | 3.21 | 3.20 | 4.54 | 1.29 | 4.27 | 1.28 | 3.00 | 2.54 |

TABLE 3-continued

| | | | | | | | | | |
|---|---|---|---|---|---|---|---|---|---|
| SrO | 0.00 | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 | 0.00 |
| $Fe_2O_3$ | 0.20 | 0.19 | 0.19 | 0.20 | 0.20 | 0.20 | 0.19 | 0.20 | 0.19 |
| $SiO_2 + B_2O_3 + Al_2O_3$ | 95.6 | 95.6 | 95.7 | 94.0 | 98.0 | 94.7 | 98.0 | 96.0 | 96.5 |
| $SiO_2 + B_2O_3$ | 86.3 | 84.8 | 84.8 | 86.1 | 91.8 | 83.5 | 85.7 | 83.8 | 83.4 |
| $(SiO_2 + B_2O_3 + Al_2O_3)/(SiO_2 + B_2O_3)$ | 1.11 | 1.13 | 1.13 | 1.09 | 1.07 | 1.13 | 1.14 | 1.15 | 1.16 |
| RO | 4.0 | 4.0 | 4.0 | 5.6 | 1.6 | 4.8 | 1.6 | 3.5 | 3.2 |
| $R_2O$ | 0.2 | 0.2 | 0.2 | 0.2 | 0.2 | 0.2 | 0.2 | 0.2 | 0.2 |
| MgO/RO | 0.19 | 0.19 | 0.19 | 0.19 | 0.19 | 0.11 | 0.19 | 0.15 | 0.19 |
| T2 (° C.) | 1583 | 1585 | 1554 | 1584 | 1574 | 1642 | 1650 | 1669 | 1586 |
| T2.5 (° C.) | 1446 | 1451 | 1422 | 1442 | 1434 | 1506 | 1518 | 1534 | 1458 |
| T3 (° C.) | 1332 | 1339 | 1312 | 1327 | 1315 | 1390 | 1402 | 1418 | 1349 |
| Devitrification temperature TL (° C.) | <1160 | 1198 | 1199 | <1160 | 1257 | <1160 | 1487 | 1305 | 1363 |
| Permittivity (1 GHz) | 4.09 | 4.15 | 4.14 | 4.17 | 3.74 | 4.26 | 4.01 | 4.19 | 4.17 |
| Dielectric loss tangent (1 GHz) | 0.0017 | 0.0016 | 0.0018 | 0.0017 | 0.0020 | 0.0013 | 0.0012 | 0.0011 | 0.0016 |
| Permittivity (5 GHz) | 4.05 | 4.12 | 4.11 | 4.14 | 3.70 | 4.23 | 3.98 | 4.16 | 4.14 |
| Dielectric loss tangent (5 GHz) | 0.0023 | 0.0023 | 0.0026 | 0.0018 | 0.0029 | 0.0016 | 0.0024 | 0.0017 | 0.0026 |
| Permittivity (10 GHz) | 3.95 | 4.02 | 4.01 | 4.05 | 3.59 | 4.14 | 3.87 | 4.07 | 4.04 |
| Dielectric loss tangent (10 GHz) | 0.0027 | 0.0028 | 0.0030 | 0.0022 | 0.0034 | 0.0021 | 0.0029 | 0.0021 | 0.0030 |

| Sample No./wt % | 41 | 42 | 43 | 44 | 45 | 46 | 47 |
|---|---|---|---|---|---|---|---|
| $SiO_2$ | 40.46 | 51.99 | 53.23 | 52.00 | 62.00 | 52.00 | 38.00 |
| $B_2O_3$ | 41.56 | 27.00 | 25.81 | 25.00 | 25.00 | 27.00 | 35.00 |
| $Al_2O_3$ | 12.94 | 17.06 | 17.06 | 16.00 | 8.00 | 10.00 | 15.00 |
| $Li_2O$ | 0.09 | 0.10 | 0.10 | 0.10 | 0.10 | 0.10 | 0.10 |
| $Na_2O$ | 0.09 | 0.15 | 0.15 | 0.15 | 0.15 | 0.15 | 0.14 |
| $K_2O$ | 0.00 | 0.00 | 0.00 | 0.00 | 0.00 | 0.00 | 0.00 |
| MgO | 0.90 | 0.57 | 0.52 | 1.56 | 1.62 | 5.56 | 7.29 |
| CaO | 3.77 | 2.94 | 2.94 | 5.00 | 2.94 | 5.00 | 4.27 |
| SrO | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $Fe_2O_3$ | 0.19 | 0.19 | 0.19 | 0.19 | 0.19 | 0.19 | 0.20 |
| $SiO_2 + B_2O_3 + Al_2O_3$ | 95.0 | 96.1 | 96.1 | 93.0 | 95.0 | 89.0 | 88.0 |
| $SiO_2 + B_2O_3$ | 82.0 | 79.0 | 79.0 | 77.0 | 87.0 | 79.0 | 73.0 |
| $(SiO_2 + B_2O_3 + Al_2O_3)/(SiO_2 + B_2O_3)$ | 1.16 | 1.22 | 1.22 | 1.21 | 1.09 | 1.13 | 1.21 |
| RO | 4.7 | 3.5 | 3.5 | 6.6 | 4.6 | 10.6 | 11.6 |
| $R_2O$ | 0.2 | 0.2 | 0.2 | 0.2 | 0.2 | 0.2 | 0.2 |
| MgO/RO | 0.19 | 0.16 | 0.15 | 0.24 | 0.36 | 0.53 | 0.63 |
| T2 (° C.) | 1389 | 1553 | 1570 | 1550 | 1739 | 1540 | 1287 |
| T2.5 (° C.) | 1268 | 1435 | 1450 | 1426 | 1591 | 1398 | 1165 |
| T3 (° C.) | 1176 | 1335 | 1348 | 1325 | 1461 | 1291 | 1091 |
| Devitrification temperature TL (° C.) | 1216 | 1505 | 1506 | <1160 | 973 | <1160 | <1160 |
| Permittivity (1 GHz) | 4.24 | 4.36 | 4.36 | 4.58 | 4.13 | 4.72 | 5.04 |
| Dielectric loss tangent (1 GHz) | 0.0029 | 0.0018 | 0.0016 | 0.0016 | 0.0005 | 0.0012 | 0.0027 |
| Permittivity (5 GHz) | 4.21 | 4.34 | 4.34 | 4.57 | 4.10 | 4.71 | 5.04 |
| Dielectric loss tangent (5 GHz) | 0.0038 | 0.0028 | 0.0026 | 0.0016 | 0.0010 | 0.0009 | 0.0004 |
| Permittivity (10 GHz) | 4.12 | 4.25 | 4.25 | 4.48 | 4.00 | 4.64 | 4.97 |
| Dielectric loss tangent (10 GHz) | 0.0043 | 0.0032 | 0.0031 | 0.0021 | 0.0004 | 0.0013 | 0.0008 |

*Examples 45 to 47 are comparative examples.

TABLE 4

| Sample No./wt % | 48 | 49 | 50 | 51 | 52 | 53 | 54 | 55 | 56 |
|---|---|---|---|---|---|---|---|---|---|
| $SiO_2$ | 54.00 | 54.00 | 53.00 | 54.00 | 52.84 | 52.47 | 52.71 | 52.32 | 52.84 |
| $B_2O_3$ | 30.00 | 31.00 | 29.35 | 30.00 | 30.91 | 30.70 | 30.83 | 30.89 | 30.91 |
| $Al_2O_3$ | 12.10 | 11.00 | 12.85 | 12.00 | 11.97 | 13.70 | 13.17 | 12.81 | 11.97 |
| $Li_2O$ | 0.10 | 0.10 | 0.12 | 0.20 | 0.20 | 0.20 | 0.36 | 0.20 | 0.20 |
| $Na_2O$ | 0.10 | 0.07 | 0.11 | 0.10 | 0.10 | 0.10 | 0.10 | 0.10 | 0.10 |
| $K_2O$ | 0.00 | 0.00 | 0.00 | 0.00 | 0.00 | 0.00 | 0.00 | 0.00 | 0.00 |
| MgO | 0.50 | 0.87 | 0.81 | 3.00 | 0.75 | 1.10 | 1.10 | 1.50 | 0.75 |
| CaO | 3.00 | 2.76 | 3.56 | 0.50 | 3.03 | 1.53 | 1.53 | 1.99 | 3.03 |
| SrO | 0.00 | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 | 0.00 |
| $Fe_2O_3$ | 0.20 | 0.20 | 0.20 | 0.20 | 0.20 | 0.20 | 0.20 | 0.19 | 0.20 |
| $SiO_2 + B_2O_3 + Al_2O_3$ | 96.1 | 96.0 | 95.2 | 96.0 | 95.7 | 96.9 | 96.7 | 96.0 | 95.7 |
| $SiO_2 + B_2O_3$ | 84.0 | 85.0 | 82.4 | 84.0 | 83.8 | 83.2 | 83.5 | 83.2 | 83.8 |
| $(SiO_2 + B_2O_3 + Al_2O_3)/(SiO_2 + B_2O_3)$ | 1.14 | 1.13 | 1.16 | 1.14 | 1.14 | 1.16 | 1.16 | 1.15 | 1.14 |
| RO | 3.5 | 3.6 | 4.4 | 3.5 | 3.8 | 2.6 | 2.6 | 3.5 | 3.8 |
| $R_2O$ | 0.2 | 0.2 | 0.2 | 0.3 | 0.3 | 0.3 | 0.5 | 0.3 | 0.3 |
| MgO/RO | 0.14 | 0.24 | 0.19 | 0.86 | 0.20 | 0.42 | 0.42 | 0.43 | 0.20 |
| T2 (° C.) | 1628 | 1675 | 1596 | 1593 | 1596 | 1573 | 1574 | 1567 | 1596 |
| T2.5 (° C.) | 1490 | 1518 | 1469 | 1463 | 1465 | 1448 | 1449 | 1439 | 1465 |
| T3 (° C.) | 1378 | 1395 | 1361 | 1354 | 1354 | 1342 | 1340 | 1331 | 1354 |
| Devitrification temperature TL (° C.) | 1283 | 1284 | 1261 | 1280 | 1267 | 1444 | 1381 | 1285 | 1267 |
| Permittivity (1 GHz) | 4.17 | 4.13 | 4.27 | 4.18 | 4.17 | 4.16 | 4.18 | 4.20 | 4.20 |
| Dielectric loss tangent (1 GHz) | 0.0012 | 0.0014 | 0.0016 | 0.0014 | 0.0013 | 0.0018 | 0.0020 | 0.0017 | 0.0017 |
| Permittivity (5 GHz) | 4.14 | 4.10 | 4.25 | 4.12 | 4.17 | 4.13 | 4.15 | 4.17 | 4.17 |
| Dielectric loss tangent (5 GHz) | 0.0024 | 0.0022 | 0.0022 | 0.0015 | 0.0025 | 0.0028 | 0.0029 | 0.0023 | 0.0025 |
| Permittivity (10 GHz) | 4.05 | 4.00 | 4.15 | 4.07 | 4.03 | 4.03 | 4.05 | 4.08 | 4.08 |
| Dielectric loss tangent (10 GHz) | 0.0023 | 0.0027 | 0.0027 | 0.0024 | 0.0022 | 0.0032 | 0.0033 | 0.0028 | 0.0029 |

| Sample No./wt % | 57 | 58 | 59 | 60 | 61 | 62 | 63 |
|---|---|---|---|---|---|---|---|
| $SiO_2$ | 52.86 | 53.10 | 53.20 | 53.01 | 53.26 | 53.21 | 53.04 |
| $B_2O_3$ | 30.39 | 30.74 | 31.13 | 30.69 | 31.15 | 31.12 | 31.02 |
| $Al_2O_3$ | 12.75 | 12.02 | 11.48 | 12.00 | 10.96 | 10.94 | 11.69 |
| $Li_2O$ | 0.20 | 0.34 | 0.37 | 0.20 | 0.20 | 0.20 | 0.29 |
| $Na_2O$ | 0.10 | 0.10 | 0.10 | 0.10 | 0.10 | 0.10 | 0.10 |
| $K_2O$ | 0.00 | 0.00 | 0.00 | 0.00 | 0.00 | 0.00 | 0.00 |
| MgO | 1.50 | 1.50 | 1.51 | 1.38 | 1.51 | 1.24 | 1.11 |
| CaO | 2.00 | 2.00 | 2.01 | 2.42 | 2.62 | 2.99 | 2.55 |
| SrO | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 |
| $Fe_2O_3$ | 0.20 | 0.20 | 0.20 | 0.20 | 0.20 | 0.20 | 0.20 |
| $SiO_2 + B_2O_3 + Al_2O_3$ | 96.0 | 95.9 | 95.8 | 95.7 | 95.4 | 95.3 | 95.8 |
| $SiO_2 + B_2O_3$ | 83.3 | 83.8 | 84.3 | 83.7 | 84.4 | 84.3 | 84.1 |
| $(SiO_2 + B_2O_3 + Al_2O_3)/(SiO_2 + B_2O_3)$ | 1.15 | 1.14 | 1.14 | 1.14 | 1.13 | 1.13 | 1.14 |
| RO |  | 3.5 | 3.5 | 3.8 | 4.1 | 4.2 | 3.7 |
| $R_2O$ | 0.3 | 0.4 | 0.5 | 0.3 | 0.3 | 0.3 | 0.4 |
| MgO/RO | 0.43 | 0.43 | 0.43 | 0.36 | 0.37 | 0.29 | 0.30 |
| T2 (° C.) | 1583 | 1585 | 1587 | 1591 | 1601 | 1603 | 1591 |
| T2.5 (° C.) | 1454 | 1456 | 1448 | 1461 | 1467 | 1469 | 1455 |
| T3 (° C.) | 1346 | 1346 | 1334 | 1351 | 1355 | 1357 | 1345 |
| Devitrification temperature TL (° C.) | 1319 | 1256 | 1228 | 1262 | 1190 | 1182 | 1251 |
| Permittivity (1 GHz) | 4.20 | 4.21 | 4.17 | 4.20 | 4.19 | 4.20 | 4.17 |
| Dielectric loss tangent (1 GHz) | 0.0017 | 0.0019 | 0.0015 | 0.0017 | 0.0016 | 0.0017 | 0.0014 |
| Permittivity (5 GHz) | 4.17 | 4.18 | 4.16 | 4.17 | 4.16 | 4.17 | 4.17 |

TABLE 4-continued

|  | | | | | | | |
|---|---|---|---|---|---|---|---|
| Dielectric loss tangent (5 GHz) | 0.0023 | 0.0024 | 0.0023 | 0.0022 | 0.0020 | 0.0021 | 0.0024 |
| Permittivity (10 GHz) | 4.08 | 4.08 | 4.05 | 4.07 | 4.06 | 4.07 | 4.03 |
| Dielectric loss tangent (10 GHz) | 0.0028 | 0.0028 | 0.0025 | 0.0027 | 0.0024 | 0.0025 | 0.0024 |

TABLE 5

| Sample No./wt % | 64 | 65 | 66 | 67 | 68 | 69 | 70 | 71 | 72 | 73 |
|---|---|---|---|---|---|---|---|---|---|---|
| $SiO_2$ | 49.95 | 49.90 | 49.70 | 49.36 | 49.83 | 49.18 | 51.59 | 51.83 | 51.87 | 51.98 |
| $B_2O_3$ | 33.44 | 33.75 | 34.13 | 34.94 | 34.21 | 34.50 | 33.25 | 33.40 | 33.44 | 33.51 |
| $Al_2O_3$ | 12.43 | 12.01 | 11.76 | 11.32 | 11.32 | 11.99 | 11.60 | 11.18 | 10.88 | 10.59 |
| $Li_2O$ | 0.10 | 0.24 | 0.31 | 0.34 | 0.24 | 0.24 | 0.07 | 0.20 | 0.30 | 0.39 |
| $Na_2O$ | 0.10 | 0.10 | 0.10 | 0.10 | 0.10 | 0.10 | 0.14 | 0.14 | 0.14 | 0.14 |
| $K_2O$ | 0.00 | 0.00 | 0.00 | 0.00 | 0.00 | 0.00 | 0.00 | 0.00 | 0.00 | 0.00 |
| MgO | 0.80 | 0.81 | 0.81 | 0.80 | 0.81 | 0.81 | 0.61 | 0.92 | 0.61 | 0.62 |
| CaO | 2.99 | 3.00 | 3.00 | 2.95 | 3.30 | 2.99 | 2.55 | 2.14 | 2.57 | 2.57 |
| SrO | 0.00 | 0.00 | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 | 0.00 | 0.00 |
| $Fe_2O_3$ | 0.19 | 0.19 | 0.19 | 0.19 | 0.19 | 0.19 | 0.19 | 0.19 | 0.19 | 0.20 |
| $SiO_2 + B_2O_3 + Al_2O_3$ | 95.8 | 95.7 | 95.6 | 95.6 | 95.4 | 95.7 | 96.4 | 96.4 | 96.2 | 96.1 |
| $SiO_2 + B_2O_3$ | 83.4 | 83.7 | 83.8 | 84.3 | 84.0 | 83.7 | 84.8 | 85.2 | 85.3 | 85.5 |
| $(SiO_2 + B_2O_3 + Al_2O_3)/(SiO_2 + B_2O_3)$ | 1.15 | 1.14 | 1.14 | 1.13 | 1.14 | 1.14 | 1.14 | 1.13 | 1.13 | 1.12 |
| RO | 3.8 | 3.8 | 3.8 | 3.7 | 4.1 | 3.8 | 3.2 | 3.1 | 3.2 | 3.2 |
| $R_2O$ | 0.2 | 0.3 | 0.4 | 0.4 | 0.3 | 0.3 | 0.2 | 0.4 | 0.4 | 0.5 |
| MgO/RO | 0.21 | 0.21 | 0.21 | 0.21 | 0.20 | 0.21 | 0.19 | 0.30 | 0.19 | 0.19 |
| T2 (° C.) | 1544 | 1540 | 1509 | 1515 | 1544 | 1529 | 1577 | 1574 | 1575 | 1576 |
| T2.5 (° C.) | 1415 | 1412 | 1391 | 1387 | 1414 | 1401 | 1446 | 1443 | 1447 | 1446 |
| T3 (° C.) | 1309 | 1305 | 1289 | 1281 | 1305 | 1295 | 1335 | 1331 | 1338 | 1331 |
| Devitrification temperature TL (° C.) | 1273 | 1222 | 1223 | 1174 | 1166 | 1222 | 1308 | 1266 | 1240 | 1188 |
| Permittivity (1 GHz) | 4.19 | 4.20 | 4.21 | 4.17 | 4.20 | 4.20 | 4.10 | 4.10 | 4.10 | 4.14 |
| Dielectric loss tangent (1 GHz) | 0.0019 | 0.0021 | 0.0014 | 0.0014 | 0.0020 | 0.0021 | 0.0017 | 0.0019 | 0.0013 | 0.0021 |
| Permittivity (5 GHz) | 4.16 | 4.17 | 4.18 | 4.16 | 4.17 | 4.17 | 4.07 | 4.07 | 4.10 | 4.11 |
| Dielectric loss tangent (5 GHz) | 0.0027 | 0.0028 | 0.0029 | 0.0029 | 0.0027 | 0.0029 | 0.0024 | 0.0024 | 0.0025 | 0.0026 |
| Permittivity (10 GHz) | 4.06 | 4.08 | 4.09 | 4.05 | 4.08 | 4.07 | 3.97 | 3.97 | 3.99 | 4.01 |
| Dielectric loss tangent (10 GHz) | 0.0031 | 0.0033 | 0.0023 | 0.0023 | 0.0031 | 0.0034 | 0.0029 | 0.0028 | 0.0022 | 0.0031 |

| Sample No./wt % | 74 | 75 | 76 | 77 | 78 | 79 | 80 | 81 |
|---|---|---|---|---|---|---|---|---|
| $SiO_2$ | 54.03 | 53.91 | 51.92 | 51.77 | 52.87 | 54.68 | 50.95 | 52.01 |
| $B_2O_3$ | 32.05 | 31.98 | 33.48 | 33.36 | 32.80 | 30.28 | 29.71 | 30.34 |
| $Al_2O_3$ | 10.17 | 10.46 | 10.90 | 11.17 | 10.61 | 11.67 | 16.03 | 11.69 |
| $Li_2O$ | 0.28 | 0.18 | 0.30 | 0.20 | 0.30 | 0.05 | 0.04 | 0.05 |
| $Na_2O$ | 0.19 | 0.19 | 0.14 | 0.14 | 0.14 | 0.19 | 0.19 | 0.19 |
| $K_2O$ | 0.00 | 0.00 | 0.00 | 0.00 | 0.00 | 0.00 | 0.00 | 0.00 |
| MgO | 0.93 | 0.93 | 0.92 | 0.61 | 0.93 | 1.23 | 1.21 | 1.23 |
| CaO | 2.15 | 2.15 | 2.14 | 2.56 | 2.15 | 1.71 | 1.68 | 4.29 |
| SrO | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 |
| $Fe_2O_3$ | 0.20 | 0.20 | 0.20 | 0.19 | 0.20 | 0.19 | 0.19 | 0.20 |
| $SiO_2 + B_2O_3 + Al_2O_3$ | 96.3 | 96.4 | 96.3 | 96.3 | 96.3 | 96.6 | 96.7 | 94.0 |
| $SiO_2 + B_2O_3$ | 86.1 | 85.9 | 85.4 | 85.1 | 85.7 | 85.0 | 80.7 | 82.4 |
| $(SiO_2 + B_2O_3 + Al_2O_3)/(SiO_2 + B_2O_3)$ | 1.12 | 1.12 | 1.13 | 1.13 | 1.12 | 1.14 | 1.20 | 1.14 |
| RO | 3.1 | 3.1 | 3.1 | 3.2 | 3.1 | 2.9 | 2.9 | 5.5 |
| $R_2O$ | 0.5 | 0.4 | 0.4 | 0.4 | 0.4 | 0.2 | 0.2 | 0.2 |
| MgO/RO | 0.30 | 0.30 | 0.30 | 0.19 | 0.30 | 0.42 | 0.42 | 0.22 |

TABLE 5-continued

|  |  |  |  |  |  |  |  |  |
|---|---|---|---|---|---|---|---|---|
| T2 (° C.) | 1611 | 1611 | 1574 | 1566 | 1588 | 1618 | 1531 | 1580 |
| T2.5 (° C.) | 1477 | 1477 | 1443 | 1434 | 1456 | 1485 | 1412 | 1447 |
| T3 (° C.) | 1360 | 1362 | 1330 | 1326 | 1343 | 1371 | 1312 | 1337 |
| Devitrification temperature TL (° C.) | 1203 | 1238 | 1247 | 1296 | 1219 | 1327 | 1506 | 1081 |
| Permittivity (1 GHz) | 4.10 | 4.09 | 4.09 | 4.08 | 4.11 | 4.09 | 4.24 | 4.31 |
| Dielectric loss tangent (1 GHz) | 0.0018 | 0.0017 | 0.0014 | 0.0012 | 0.0020 | 0.0014 | 0.0018 | 0.0016 |
| Permittivity (5 GHz) | 4.06 | 4.05 | 4.08 | 4.09 | 4.08 | 4.05 | 4.21 | 4.29 |
| Dielectric loss tangent (5 GHz) | 0.0019 | 0.0018 | 0.0024 | 0.0025 | 0.0020 | 0.0016 | 0.0024 | 0.0014 |
| Permittivity (10 GHz) | 3.97 | 3.95 | 3.97 | 3.95 | 3.98 | 3.96 | 4.12 | 4.20 |
| Dielectric loss tangent (10 GHz) | 0.0023 | 0.0023 | 0.0021 | 0.0020 | 0.0030 | 0.0020 | 0.0029 | 0.0018 |

TABLE 6

| Sample No./wt % | 82 | 83 | 84 | 85 | 86 | 87 | 88 | 89 |
|---|---|---|---|---|---|---|---|---|
| $SiO_2$ | 50.79 | 49.70 | 49.35 | 49.71 | 49.48 | 49.40 | 49.40 | 49.40 |
| $B_2O_3$ | 27.95 | 34.13 | 34.95 | 29.06 | 29.09 | 29.68 | 28.25 | 27.80 |
| $Al_2O_3$ | 14.47 | 11.76 | 11.32 | 14.45 | 14.46 | 13.97 | 16.35 | 16.65 |
| $Li_2O$ | 0.17 | 0.31 | 0.34 | 0.17 | 0.17 | 0.32 | 0.20 | 0.20 |
| $Na_2O$ | 0.13 | 0.10 | 0.10 | 0.13 | 0.13 | 0.13 | 0.13 | 0.13 |
| $K_2O$ | 0.00 | 0.00 | 0.00 | 0.00 | 0.00 | 0.00 | 0.00 | 0.00 |
| MgO | 1.50 | 0.81 | 0.80 | 1.50 | 1.68 | 1.50 | 1.50 | 1.50 |
| CaO | 4.80 | 3.00 | 2.95 | 4.79 | 4.80 | 4.81 | 3.98 | 4.13 |
| SrO | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 |
| $Fe_2O_3$ | 0.19 | 0.19 | 0.19 | 0.19 | 0.19 | 0.19 | 0.19 | 0.19 |
| $SiO_2 + B_2O_3 + Al_2O_3$ | 93.2 | 95.6 | 95.6 | 93.2 | 93.0 | 93.0 | 94.0 | 93.9 |
| $SiO_2 + B_2O_3$ | 78.7 | 83.8 | 84.3 | 78.8 | 78.6 | 79.1 | 77.7 | 77.2 |
| $(SiO_2 + B_2O_3 + Al_2O_3)/(SiO_2 + B_2O_3)$ | 1.18 | 1.14 | 1.13 | 1.18 | 1.18 | 1.18 | 1.21 | 1.22 |
| RO | 6.3 | 3.8 | 3.7 | 6.3 | 6.5 | 6.3 | 5.5 | 5.6 |
| $R_2O$ | 0.3 | 0.4 | 0.4 | 0.3 | 0.3 | 0.5 | 0.3 | 0.3 |
| MgO/RO | 0.24 | 0.21 | 0.21 | 0.24 | 0.26 | 0.24 | 0.27 | 0.27 |
| T2 (° C.) | 1533 | 1509 | 1515 | 1496 | 1498 | 1485 | 1502 | 1505 |
| T2.5 (° C.) | 1405 | 1391 | 1387 | 1382 | 1382 | 1368 | 1389 | 1388 |
| T3 (° C.) | 1301 | 1289 | 1281 | 1286 | 1286 | 1269 | 1293 | 1291 |
| Devitrification temperature TL (° C.) |  | 1223 | <1169 | <1169 | <1169 | 1006 | 1290 | 1274 |
| Permittivity (1 GHz) | 4.61 | 4.31 | 4.29 | 4.60 | 4.62 | 4.62 | 4.60 | 4.63 |
| Dielectric loss tangent (1 GHz) | 0.0017 | 0.0023 | 0.0024 | 0.0018 | 0.0019 | 0.0021 | 0.0017 | 0.0018 |
| Permittivity (5 GHz) | 4.59 | 4.28 | 4.26 | 4.58 | 4.60 | 4.60 | 4.60 | 4.62 |
| Dielectric loss tangent (5 GHz) | 0.0016 | 0.0028 | 0.0029 | 0.0018 | 0.0017 | 0.0020 | 0.0024 | 0.0024 |
| Permittivity (10 GHz) | 4.51 | 4.18 | 4.17 | 4.50 | 4.51 | 4.52 | 4.50 | 4.51 |
| Dielectric loss tangent (10 GHz) | 0.0023 | 0.0036 | 0.0037 | 0.0026 | 0.0024 | 0.0028 | 0.0032 | 0.0032 |
| Water resistance (wt %) | 0.04 |  |  |  | 0.06 |  | 0.02 | 0.02 |

| Sample No./wt % | 90 | 91 | 92 | 93 | 94 | 95 | 96 |
|---|---|---|---|---|---|---|---|
| $SiO_2$ | 49.40 | 49.37 | 49.40 | 49.29 | 49.63 | 50.25 | 50.16 |
| $B_2O_3$ | 28.00 | 28.48 | 28.00 | 32.43 | 32.48 | 31.87 | 31.93 |
| $Al_2O_3$ | 16.80 | 15.89 | 16.30 | 12.62 | 13.24 | 13.22 | 13.25 |
| $Li_2O$ | 0.20 | 0.20 | 0.20 | 0.15 | 0.15 | 0.15 | 0.15 |

TABLE 6-continued

| | | | | | | | |
|---|---|---|---|---|---|---|---|
| Na$_2$O | 0.13 | 0.19 | 0.13 | 0.05 | 0.05 | 0.05 | 0.05 |
| K$_2$O | 0.00 | 0.00 | 0.00 | 0.00 | 0.00 | 0.00 | 0.00 |
| MgO | 1.50 | 1.50 | 1.50 | 0.49 | 0.49 | 0.49 | 0.49 |
| CaO | 3.78 | 4.18 | 4.28 | 1.78 | 1.70 | 1.32 | 1.70 |
| SrO | 0.00 | 0.00 | 0.00 | 3.09 | 2.16 | 2.55 | 2.17 |
| TiO$_2$ | 0.00 | 0.00 | 0.00 | 0.00 | 0.00 | 0.00 | 0.00 |
| Fe$_2$O$_3$ | 0.19 | 0.19 | 0.19 | 0.10 | 0.10 | 0.10 | 0.10 |
| SiO$_2$ + B$_2$O$_3$ + Al$_2$O$_3$ | 94.2 | 93.8 | 93.7 | 94.3 | 95.3 | 95.3 | 95.3 |
| SiO$_2$ + B$_2$O$_3$ | 77.4 | 77.9 | 77.4 | 81.7 | 82.1 | 82.1 | 82.1 |
| (SiO$_2$ + B$_2$O$_3$ + Al$_2$O$_3$)/(SiO$_2$ + B$_2$O$_3$) | 1.22 | 1.20 | 1.21 | 1.15 | 1.16 | 1.16 | 1.16 |
| RO | 5.3 | 5.7 | 5.8 | 5.4 | 4.4 | 4.4 | 4.4 |
| R$_2$O | 0.3 | 0.4 | 0.3 | 0.2 | 0.2 | 0.2 | 0.2 |
| MgO/RO | 0.28 | 0.26 | 0.26 | 0.09 | 0.11 | 0.11 | 0.13 |
| T2 (° C.) | 1495 | 1500 | 1498 | 1562 | 1555 | 1572 | 1578 |
| T2.5 (° C.) | 1376 | 1380 | 1378 | 1429 | 1424 | 1440 | 1451 |
| T3 (° C.) | 1280 | 1281 | 1280 | 1319 | 1317 | 1330 | 1342 |
| Devitrification temperature TL (° C.) | 1247 | 1168 | 1175 | 1258 | 1312 | 1332 | 1301 |
| Permittivity (1 GHz) | 4.61 | 4.61 | 4.64 | 4.32 | 4.28 | 4.30 | 4.30 |
| Dielectric loss tangent (1 GHz) | 0.0021 | 0.0022 | 0.0020 | 0.0009 | 0.0009 | 0.0008 | 0.0008 |
| Permittivity (5 GHz) | 4.59 | 4.59 | 4.62 | 4.29 | 4.25 | 4.27 | 4.27 |
| Dielectric loss tangent (5 GHz) | 0.0025 | 0.0024 | 0.0023 | 0.0012 | 0.0015 | 0.0014 | 0.0014 |
| Permittivity (10 GHz) | 4.51 | 4.51 | 4.54 | 4.16 | 4.15 | 4.18 | 4.17 |
| Dielectric loss tangent (10 GHz) | 0.0033 | 0.0032 | 0.0031 | 0.0022 | 0.0021 | 0.0023 | 0.0021 |
| Water resistance (wt %) | 0.21 | 0.29 | 0.21 | | | | |

The invention claimed is:

1. A glass filler comprising a glass composition,
the glass filler being in a form of at least one selected from the group consisting of a glass flake, a chopped strand, a glass powder, a glass bead, and a flaky glass, wherein the glass composition comprises, in wt %:

40≤SiO$_2$≤60;

30<B$_2$O$_3$≤45;

5≤Al$_2$O$_3$≤15; and 0.01≤T-Fe$_2$O$_3$≤0.5, wherein
the glass composition satisfies:

SiO$_2$+B$_2$O$_3$≥80; and/or

SiO$_2$+B$_2$O$_3$≥78 and 0<RO<10, wherein
the glass compositions further satisfies:

0<R$_2$O≤5; and

0<RO<15, where R$_2$O is at least one oxide selected from Li$_2$O, Na$_2$O, and K$_2$O; RO is at least one oxide selected from MgO, CaO, and SrO; and T-Fe$_2$O$_3$ is total iron oxide calculated as Fe$_2$O$_3$ in the glass composition.

2. A resin composition comprising:
the glass filler according to claim 1; and
a thermoplastic resin.

3. A method for manufacturing a glass filler, the method comprising:
melting the glass composition according to claim 1; and
forming the molten glass composition into a glass filler.

4. A method for manufacturing the glass filler according to claim 1, the method comprising:
melting a glass raw material, the glass raw material being prepared such that a glass composition constituting the glass filler is obtained from the glass raw material; and
forming the glass raw material being molten into the glass filler.

5. A glass filler comprising a glass composition,
the glass filler being in a form of at least one selected from the group consisting of a glass flake, a chopped strand, a glass powder, a glass bead, and a flaky glass, wherein the glass composition comprises, in wt %:

53≤SiO$_2$≤58;

26≤B$_2$O$_3$≤29.9;

7.5≤Al$_2$O$_3$≤18;

0≤CaO≤3.5;

0≤ZnO≤1; and 0.01≤T-Fe$_2$O$_3$≤0.5, where T-Fe$_2$O$_3$ is total iron oxide calculated as Fe$_2$O$_3$ in the glass composition, wherein
the glass composition satisfies, in wt %, SiO$_2$+B$_2$O$_3$≥80, wherein a permittivity at a frequency of 1 GHz is 4.4 or less, a dielectric loss tangent at a frequency of 1 GHz is 0.007 or less, and a temperature T2 at which a viscosity is $10^2$ dPa·s is 1700° C. or less.

6. The glass filler according to claim 5, wherein the glass composition comprises, in wt %:

$53 \leq SiO_2 < 58$;

$26 \leq B_2O_3 \leq 29.9$;

$7.5 \leq Al_2O_3 \leq 18$;

$0 \leq Li_2O \leq 1.5$;

$0 \leq Na_2O \leq 1.5$;

$0 \leq K_2O \leq 1$;

$0 \leq MgO < 10$;

$0 \leq CaO \leq 3.5$;

$0 \leq SrO \leq 5$;

$0 \leq ZnO \leq 1$; and $0.01 \leq T\text{-}Fe_2O_3 \leq 0.5$, wherein the glass compositions further satisfies:

$0 < R_2O \leq 4$; and $1 \leq RO < 10$, where $R_2O$ is at least one oxide selected from $Li_2O$, $Na_2O$, and $K_2O$, and RO is at least one oxide selected from MgO, CaO, and SrO.

7. The glass filler according to claim 5, wherein the glass composition is substantially free of BaO and PbO.

8. The glass filler according to claim 5, wherein the glass composition is substantially free of $TiO_2$.

9. The glass filler according to claim 5, wherein the glass composition comprises, in wt %, $0 < TiO_2 \leq 1$.

10. The glass composition according to claim 5, comprising, in wt %, $SnO_2 < 0.5$.

11. The glass composition according to claim 5, comprising, in wt %, $BaO < 0.5$.

12. The glass composition according to claim 5, comprising, in wt %, $53 \leq SiO_2 < 55$.

13. The glass composition according to claim 5, comprising, in wt %, $27 \leq B_2O_3 \leq 29.9$.

14. A resin composition comprising:
the glass filler according to claim 5; and
a thermoplastic resin.

15. A method for manufacturing a glass filler, the method comprising:
melting the glass composition according to claim 5; and
forming the molten glass composition into a glass filler.

16. A method for manufacturing the glass filler according to claim 5, the method comprising:
melting a glass raw material, the glass raw material being prepared such that a glass composition constituting the glass filler is obtained from the glass raw material; and
forming the glass raw material being molten into the glass filler.

17. A glass filler comprising a glass composition, the glass filler being in a form of at least one selected from the group consisting of a glass flake, a chopped strand, a glass powder, a glass bead, and a flaky glass, wherein
the glass composition comprises, in wt %:

$53 \leq SiO_2 \leq 58$;

$26 \leq B_2O_3 \leq 29.9$;

$10 \leq Al_2O_3 < 15$;

$0 \leq CaO \leq 3.5$;

$0 \leq ZnO \leq 1$; and $0.01 \leq T\text{-}Fe_2O_3 \leq 0.5$, wherein
the glass composition satisfies:

$SiO_2 + B_2O_3 \geq 82$;

$SiO_2 + B_2O_3 + Al_2O_3 \leq 98$;

$0 < R_2O \leq 5$; and $0 < RO < 15$, where $R_2O$ is at least one oxide selected from $Li_2O$, $Na_2O$, and $K_2O$; RO is at least one oxide selected from MgO, CaO, and SrO; and $T\text{-}Fe_2O_3$ is total iron oxide calculated as $Fe_2O_3$ in the glass composition.

18. A resin composition comprising:
the glass filler according to claim 17; and
a thermoplastic resin.

19. A method for manufacturing a glass filler, the method comprising:
melting the glass composition according to claim 17; and
forming the molten glass composition into a glass filler.

20. A method for manufacturing the glass filler according to claim 17, the method comprising:
melting a glass raw material, the glass raw material being prepared such that a glass composition constituting the glass filler is obtained from the glass raw material; and
forming the glass raw material being molten into the glass filler.

* * * * *